United States Patent [19]
Aoki

[11] Patent Number: 5,964,424
[45] Date of Patent: Oct. 12, 1999

[54] CASSETTE CONTAINER CAPABLE OF ACCOMMODATING PLURAL KINDS OF CASSETTES OF DIFFERENT SIZES

[75] Inventor: Osamu Aoki, Kanagawa, Japan

[73] Assignee: Sony Corporation, Tokyo, Japan

[21] Appl. No.: 08/933,436

[22] Filed: Sep. 18, 1997

[30] Foreign Application Priority Data

Sep. 20, 1996 [JP] Japan .................................. 8-269096

[51] Int. Cl.$^6$ .................................................. G11B 23/04
[52] U.S. Cl. ......................... 242/336; 242/338.4; 360/94
[58] Field of Search ................................ 242/336, 338.4; 360/94, 96.5

[56] References Cited

U.S. PATENT DOCUMENTS 5,184,261  2/1993  Noguchi ..................................... 360/94

Primary Examiner—John Q. Nguyen
Attorney, Agent, or Firm—Frommer Lawrence & Haug, LLP.; William S. Frommer

[57] ABSTRACT

A cassette container capable of accommodating plural kinds of cassettes of different sizes including a plate for supporting a cassette to be mounted so as to be in contact with a surface thereof. In this cassette container, a pair of cassette guides are provided for guiding a cassette of a predetermined size which is less than a predetermined maximum size to a mounting position. These pair of cassette guides can be lowered by insertion of a cassette larger than the cassette of the predetermined size to a lower side of the plate. A pair of leaf springs urge the pair of cassette guides toward an upper side of the plate respectively. In addition, the pair of cassette guides are inclined toward a cassette insertion side when the cassette guides move to the upper side of the plate upon urging of the pair of leaf springs. The pair of cassettes are positioned approximately parallel with the plate when the cassette guides are lowered to the lower side of the plate by insertion of the larger cassette.

4 Claims, 19 Drawing Sheets

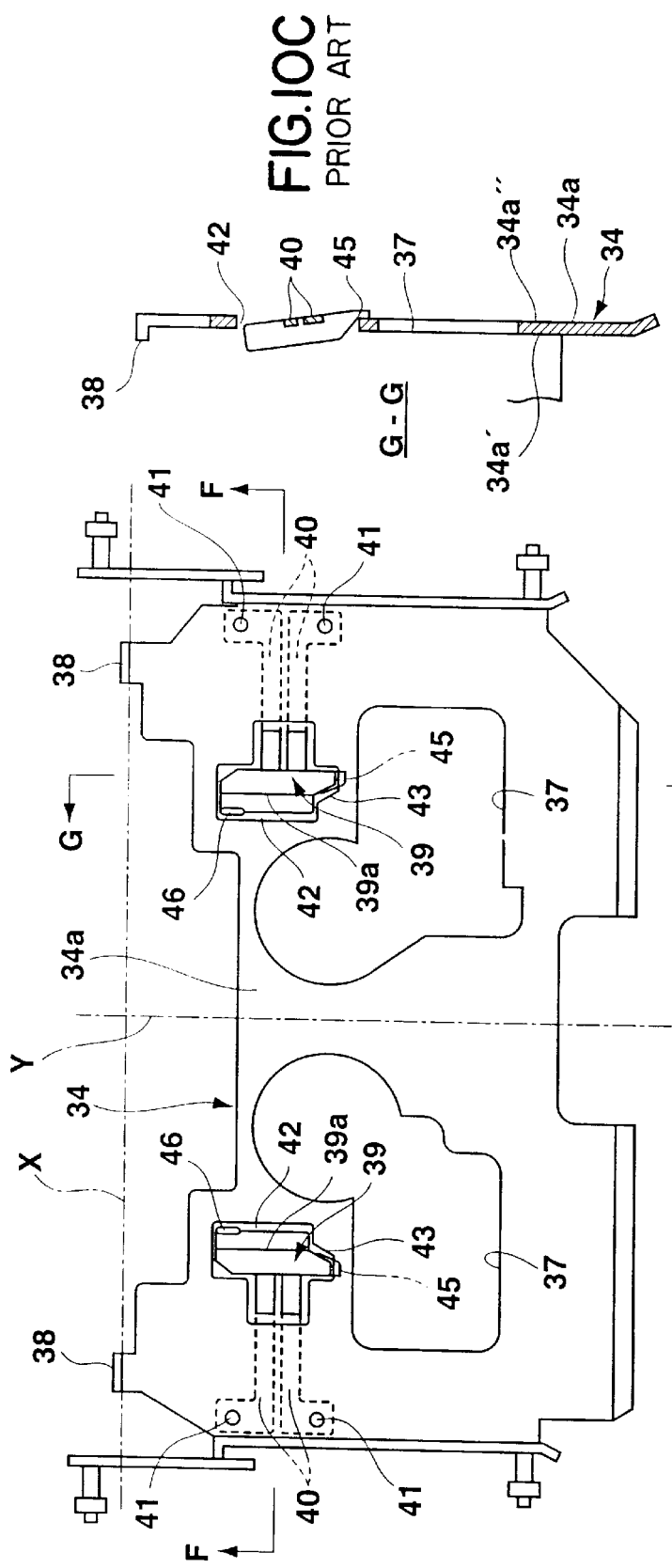
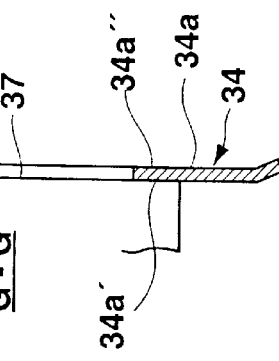
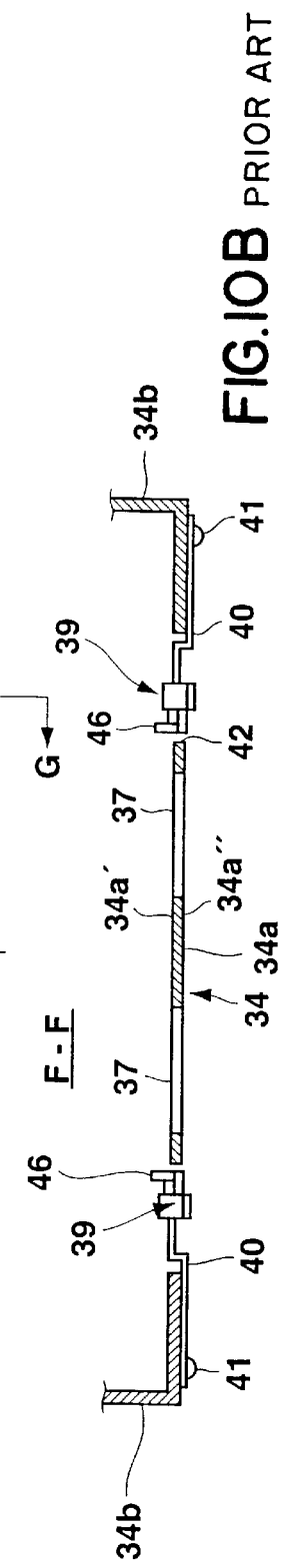

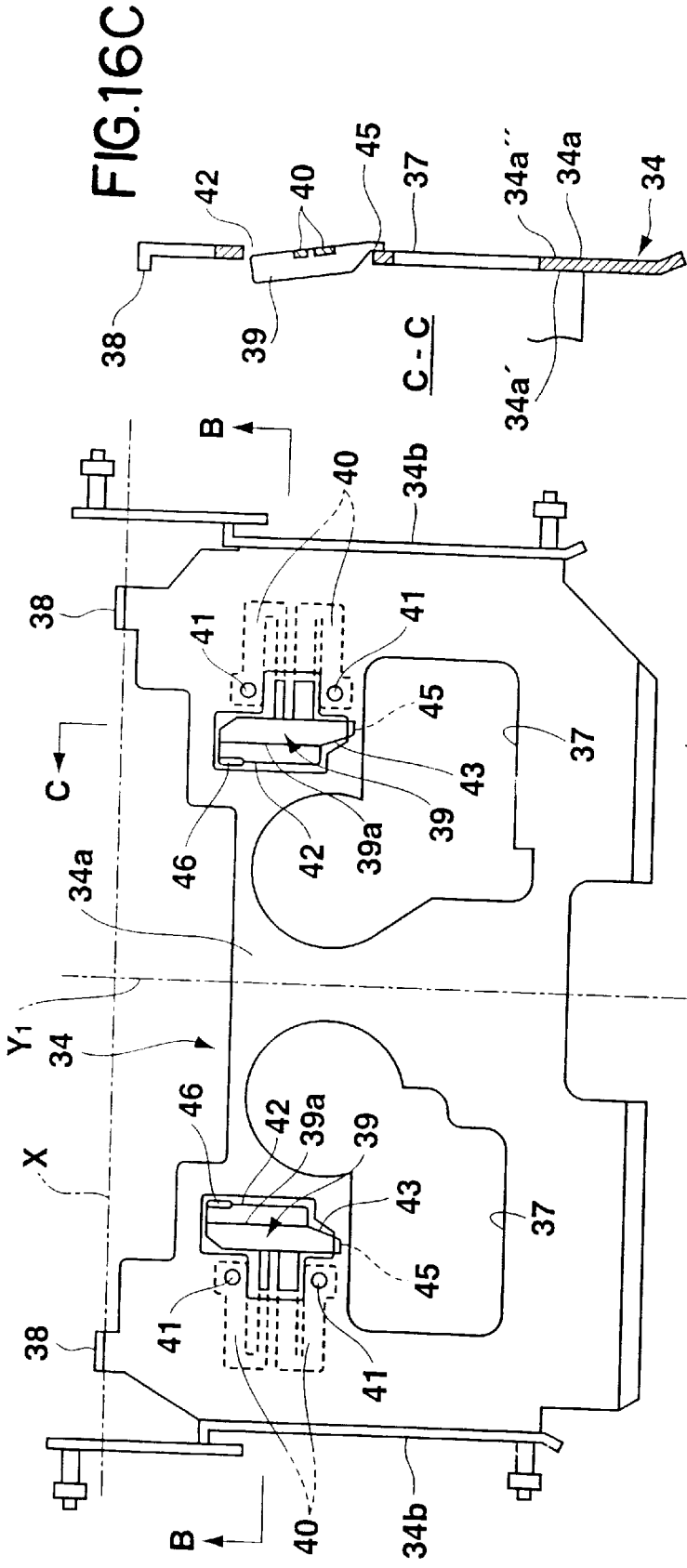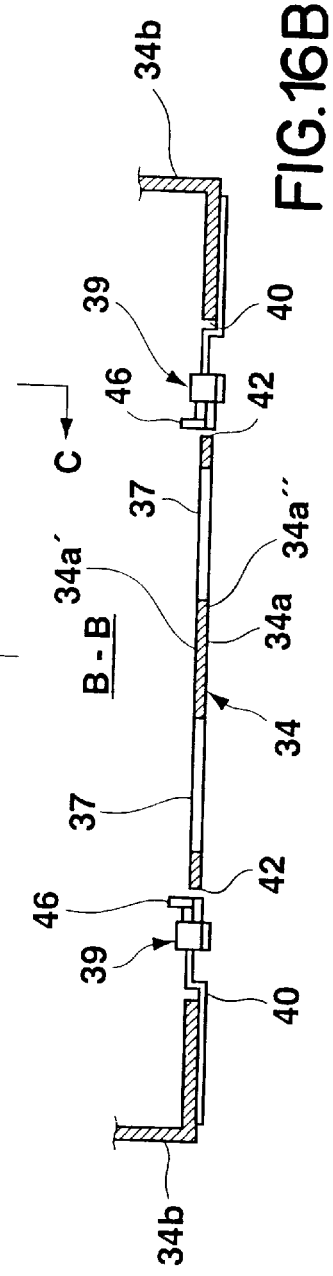

CASSETTE CONTAINER CAPABLE OF ACCOMMODATING PLURAL KINDS OF CASSETTES OF DIFFERENT SIZES

FIELD OF THE INVENTION

The present invention relates to a cassette container of a cassette type recording/playback apparatus most suitable for application to a recorder or the like that can perform recording and playback while selectively using plural kinds of cassettes of different sizes.

BACKGROUND OF THE INVENTION

FIGS. 1A–1B and 2A–2B show a cassette container in which an opening 3 is formed at the side of an outer case 2 of a video camera main body 1. A video tape recorder 4 is vertically incorporated in the outer case 2, i.e., in the inner part of the space communicating with the opening 3. The video tape recorder 4 can perform recording and playback on two kinds of tape cassettes, i.e., a large-size tape cassette 11 and a small-size tape cassette 12, that are selectively mounted in the cassette container. As shown in FIGS. 3A–3B, 4A–4B, 5, and 6, the large-size tape cassette 11 and the small-size tape cassette 12 are approximately similar to each other in shape and incorporate a magnetic tape 14 that is wound on a pair of tape reels 13 (arranged in the right-left direction). The magnetic tape 14 is wound so as to traverse, in the right-left direction, a central opening 15 that is formed at the center on the side of a front end 11a or 12a of the large-size or small-size tape cassette 11 or 12. A double opening/closing lid 16 that opens and closes so as to enclose the magnetic tape 14 from the front and rear in the central opening 15 is attached to the front end 11a or 12a.

As shown in FIGS. 1A–1B, 2A–2B, 5–7, a mechanical deck 21 of the video tape recorder 4 is formed vertically and mounted, in the lateral direction, with a pair of reel bases 22 (arranged in the right-left direction), a pair of positioning pins 23 (arranged in the right-left direction), a tape loading mechanism 24, a rotary head drum 25, a pair of brake drums 26 (arranged in the right-left direction), a band brake 27, a soft brake 28, a unidirectional clutch 29, and other various mechanical parts for recording and playback. A pair of reel base gears 22a (arranged in the right-left direction) which are formed on the outer circumferences of the pair of reel bases 22 at their lower ends so as to be integral with the latter always mesh with a pair of brake drum gears 26a (arranged in the right-left direction) which are formed on the outer circumferences of the pair of brake drums 26. The pair of reel bases 22 reciprocate between positions with a small interval $L_1$ for the small-size tape cassette 12 (indicated by solid lines in FIG. 7) and positions with a large interval $L_2$ for the large-size tape cassette 11 (indicated by chain lines in FIG. 7) in the directions of arrows a and b by making symmetrical circular movements about the pair of brake drums 26. The band brake 27 is wound on the outer circumference of the tape supply side brake drum 26 which is disposed on the tape supply side (right side in FIG. 7). The braking force of the band brake 26 is controlled by a tension regulator 24a of the tape loading mechanism 24. The soft brake 28 is in contact with the outer circumference of the tape take-up side brake drum 26 which is disposed on the tape take-up side (left side in FIG. 7). The unidirectional clutch 29 is incorporated between the tape take-up side brake drum 26 and the brake drum gear 26a that is formed on the outer circumference of the former.

As shown in FIGS. 5 and 6, the large-size and small-size tape cassettes 11 and 12 are selectively mounted into the mechanical deck 21 in parallel therewith in a vertical state with the front ends 11a and 12a down, whereby the pair of tape reels 13 are engaged with the pair of reel bases 22. At this time, the pair of positioning pins 23 cause the front end 11a or 12a and the center in the right-left direction of the large-size tape cassette 11 or the small-size tape cassette 12 to be positioned on a horizontal reference line X and a vertical reference line Y on the mechanical deck 21, respectively. After the cassette mounting, the tape loading mechanism 24 causes the magnetic tape 14 in the large-size cassette tape 11 or the small-size cassette tape 12 to be pulled out downward and loaded onto the rotary drum 25. Thus, recording or playback is performed on the magnetic tape 14 of a selected one of the large-size and small-size tape cassettes 11 and 12. During recording or a playback on the magnetic or its fast feed, the braking force of the tape supply side brake drum 26 is controlled by the band brake 27, whereby the back tension of the magnetic tape 14 is controlled to have a constant value. During rewinding, the soft brake 28 exerts weak braking force on the tape take-up side brake drum 26, whereby uncontrolled running of the magnetic tape 14 is prevented. During recording, a playback, or a fast feed, the soft brake 28 does not serve as a load because the unidirectional clutch 29 of the tape take-up side brake drum 26 is rendered in a free rotation state.

As shown in FIGS. 1A–1B to 4, 8, and 9 a pop-up cassette attaching/detaching device 33 is provided with a vertical cassette holder 34 which is configured so as to be freely entered into and removed from the outer case 2 of the video camera main body 1 in the horizontal, i.e., lateral, direction (indicated by arrows c and d) through the approximately rectangular opening 3 which is formed at the side of the outer case 2. A cassette input/output mouth 35 is formed at an upper end portion of the cassette holder 34. A door 36 for opening and closing the opening 3 of the outer case 2 is vertically attached to the side face of a top plate 34c of the cassette holder 34. The door 36 is slidable with respect to the cassette holder 34 in the top-bottom direction (indicated by arrows e and f).

The cassette holder 34 is configured so as to be reciprocated in parallel with the direction of arrows c and d by a pop-up mechanism that is attached to the mechanical deck 21. As shown in FIGS. 1A and 2A, when an ejection button is pushed, the cassette holder 34 is popped up in the direction of arrow c through the opening 3 to a cassette input/output position $P_1$ which is outside the outer case 2 and the door 36 is slid downward, i.e., in the direction of arrow e, whereby the cassette input/output mouth 35 is opened widely. In this state, as described later in detail, after a selected one of the large-size and small-size tape cassettes 11 and 12 is inserted downward, i.e., in the direction of arrow e, into the cassette holder 34 through the cassette input/output mouth 35, the cassette holder 34 is pressed into a cassette mounting position $P_2$ in the outer case 2 through the opening 3 by pushing the door 36 in the direction of arrow d as shown in FIGS. 1B and 2B. As a result, the door 36 is pressed in the direction d while being slid in the direction of arrow f, to close the opening 3.

As shown in FIGS. 5 and 6, as a result of the above cassette mounting operation, the selected one of the large-size and small-size tape cassettes 11 and 12 are mounted into the mechanical deck 21 in the direction of arrow d so as to be orientated downward and vertically with the front end 11a or 12a and the center in the right-left direction of the tape cassette 11 or 12 located on the horizontal and vertical reference lines X and Y on the mechanical deck 21, respectively. When the large-size or small-size tape cassette 11 or 12 is ejected after recording or a playback, a reverse operation to the cassette mounting operation is performed. That is, as shown in FIGS. 1A and 2A, by pushing the ejection button, the cassette holder 34 is popped up in the direction of arrow c to the cassette input/output position $P_1$ which is outside the outer case 32 and the door 36 is slid in the direction of arrow e, whereby the cassette input/output mouth 35 is opened widely. In this state, the large-size tape cassette 11 or the small-size tape cassette 12 is removed from the cassette holder 34 upward, i.e., in the direction of arrow f.

As shown in FIGS. 1–4 and 10, the cassette holder 34 is made of sheet metal or the like and is formed so as to have an approximately bracket-shaped cross-section by a bottom plate 34b and both, i.e., right and left, side plates 34b. The cassette holder 34 is disposed vertically in parallel with the side face of the vertical mechanical deck 21, and a top end opening of the cassette holder 34 forms the cassette input/output mouth 35. The door 36 is attached to the side face of the top plate 34c bridging the open ends of both side plates 34b of the cassette holder 34 so as to be parallel with the bottom plate 34a and slidable in the top-bottom direction (indicated by arrows e and f). The bottom plate 34a of the cassette holder 34 is formed with a pair of reel base insertion holes 37 (arranged in the right-left direction) which are approximately L-shaped, opposed to each other, and formed symmetrically in movement ranges of the pair of reel bases 22 (see FIGS. 5 and 6) in the directions of arrows a and b. Lower peripheral portions, located at right and left end positions, of the bottom plate 34a is formed with, in an integral manner, a pair of large cassette stoppers 38 (arranged in the right-left direction) for locating the front end 11a and the center in the right-left direction of the large-size tape cassette 11 on the horizontal and vertical reference lines X and Y on the mechanical deck 21, respectively.

As shown in FIGS. 10–12, a pair of small cassette guides 39 (arranged in the right-left direction) which are formed by molding synthetic resin or the like and serve to locate the front end 12a and the center in the right-left direction of the small-size tape cassette 12 on the horizontal and vertical reference lines X and Y on the mechanical deck 21, respectively, are attached to the bottom plate 34a of the cassette holder 34 at positions deviated to the lower end. The pair of small cassette guides 39 are disposed parallel with the vertical reference line Y at positions equally distant from it in the right-left direction. The inside ends of a pair of symmetrical leaf springs 40 (arranged in the right-left direction) are fixed to bottom faces 39c (faces opposed to the mechanical deck 21) of the pair of small cassette guides 39 by welding or the like. The outside ends of the leaf springs 40 are fixed to bottom faces 34a" (faces opposed to the mechanical deck 21) of the bottom plate 34a by a pair of caulking pins 41. Thus, the pair of leaf springs 40 allow the small cassette guides 39 to move in the directions of arrows c and d through a pair of guide insertion holes 42 (arranged in the right-left direction) formed in the bottom plate 34a between a position that protruded, by a height $H_1$, to the side of a top face 34a' (face on the side of the cassette insertion space) of the bottom plate 34a (see FIG. 11B) and a position that is lowered, by a height $H_2$, to the side of the bottom face 34a" (face opposed to the mechanical deck 21) of the bottom plate 34a (see FIG. 11C).

As shown in FIGS. 11–12, each of opposed (in the right-left direction) faces 39a of the pair of small cassette guides 39 is formed, at an upper end portion, with a tapered face 43 for introducing the small-size tape cassette 12. A top surface 39b that is perpendicular to each opposed face 39a is formed with a slant face 44 at an upper end portion. As shown in FIG. 11A, the length of protrusion of the pair of small cassette guides 39 to the side of the top face 34a' of the bottom plate 34a is restricted such that stopper pieces 45 that are formed at upper portions of the bottom face 39c of the small cassette guides 39 so as to be integral with the latter butt against the bottom face 34a" of the bottom plate 34a in the direction of arrow c. A pair of small cassette stoppers 46 for locating the front end 12a of the small-size tape cassette 12 at the horizontal reference line X on the mechanical deck 21 are formed vertically on the lower end side of the small cassette guides 39 at positions deviated inward from the opposed faces 39a so as to be integral with the small cassette guides 39.

As shown in FIGS. 3A and 3B, the small-size tape cassette 12 is inserted between the pair of small cassette guides 39 in the direction of arrow e, and the center of the small-size tape cassette 12 in the right-left direction is positioned on the vertical reference line Y by the small cassette guides 39. At the same time, a pair of parallel stopper insertion grooves 12b (arranged in the right-left direction) formed at right and left ends of the front end 12a of the small-size tape cassette 12 are inserted into the pair of small cassette stoppers 46 in the direction of arrow e, and the front end 12a of the small-size tape cassette 12 is positioned on the horizontal reference line X by the pair of small cassette stoppers 46. One of the small cassette stoppers 46 releases a lock lever of the opening/closing lid 16 of the small-size tape cassette 12.

On the other hand, as shown in FIGS. 4A and 4B, the large-size tape cassette 11 is inserted between the pair of side plates 34b of the cassette holder 34 in the direction of arrow e, and the center of the large-size tape cassette 11 in the right-left direction is positioned on the vertical reference line Y. At the same time, the front end 11a of the large-size tape cassette 11 butts against the pair of large cassette stoppers 38 (arranged in the right-left direction) in the direction of arrow e, and the front end 11a is positioned on the horizontal reference line X. A lock lever of the opening/closing lid 16 of the large-size tape cassette 11 is released by an upright piece that is erected on the bottom plate 34.

As shown in FIGS. 3A–3B and 4A–4B, a cassette pressing member 48 is disposed horizontally at such a position as to traverse the pair of small cassette guides 39 and deviate to the top plate 34c which bridges the right and left side plates 34b. The cassette pressing member 48 is attached to the cassette holder 34 between the right and left side plates 34b so as to be rotatable in the directions of arrows m and n through a pair of fulcrum pins 49 (arranged in the right-left direction). The cassette pressing member 48 is rotationally urged in the cassette pressing direction of arrow m by a pair of tension coil springs 50 (urging means; arranged in the right-left direction).

In the above-configured cassette container to which the present invention is not applied, the small-size tape cassette 12 is mounted in the following manner. As shown in FIGS. 1A and 3A–3B, the small-size tape cassette 12 that is oriented vertically with its front end 12a down is inserted, in the direction of arrow e, into the approximately central (in the right-left direction) portion of the cassette holder 34 that is located at the cassette input/output position $P_1$, and further inserted between the pair of small cassette guides 39. Further, while the small-size tape cassette 12 is pressed against the bottom plate 34a in a parallel manner by the cassette pressing member 48 which is rotationally urged in the direction of arrow m by the tension coil springs 50, the small-size tape cassette 12 is inserted in the direction of arrow e deep into the cassette holder 34 to the insertion reference position where it abuts against the pair of small cassette stoppers 46 of the pair of small cassette guides 39 and is thereby stopped. When completion of the insertion of the small-size tape cassette 12 into the cassette holder 34 is detected by a sensor that is attached to the cassette holder 34, the pair of reel bases 22 on the mechanical deck 21 are instantaneously moved in the directions of arrows a as shown in FIG. 5, whereby the interval between the reel bases 22 is automatically adjusted to the small interval $L_1$ suitable for the small-size tape cassette 12.

After the completion of the insertion of the small-size tape cassette 12, the door 36 is pushed by a finger in the direction of arrow d as shown in FIG. 1B, whereby the cassette holder 34 is pressed (translated) in the direction of arrow d from the cassette input/output position $P_1$ to the cassette mounting position $P_2$ within the outer case 2 through the opening 3. Thus, the small-size tape cassette 12 is mounted on the mechanical deck 21 as shown in FIG. 5. At the cassette mounting position $P_2$, the cassette holder 34 is automatically locked on the mechanical deck 21 by a lock mechanism. During the cassette mounting operation, the door 36 is slid with respect to the cassette holder 34 in the direction of arrow f, to close the opening 3 of the outer case 2. At this time, as a result of the insertion of the cassette holder 34 to the cassette mounting position $P_2$, the opening/closing lid 16 of the small-size tape cassette 12 is opened in the direction of arrow o by a lid opening/closing member, to enable the magnetic tape 14 in the small-size tape cassette 12 to be pulled out downward from the central opening 15. In removing the small-size tape cassette 12, the lock of the cassette holder 34 on the mechanical deck 21 is canceled upon depression of the ejection button. Then, as shown in FIG. 1A, as described above, the cassette holder 34 is popped up (translated) in the direction of arrow c by the pop-up mechanism from the cassette mounting position $P_2$ to the cassette input/output position $P_1$ through the opening 3. Further, as described above, the door 36 is slid with respect to the cassette holder 34 in the direction of arrow e, whereby the cassette input/output mouth 35 of the cassette holder 34 is opened widely.

The large-size tape cassette 11 is mounted in the following manner. As shown in FIGS. 2A and 4A–4B, the large-size tape cassette 11 that is oriented vertically with its front end 11a down is inserted, in the direction of arrow e, between the right and left side plates 34b of the cassette holder 34 that is located at the cassette input/output position $P_1$. Further, while the large-size tape cassette 11 is pressed against the bottom plate 34a in a parallel manner by the cassette pressing member 48, the large-size tape cassette 11 is inserted in the direction of arrow e deep into the cassette holder 34 to the insertion reference position where it abuts against the pair of large cassette stoppers 38 and is thereby stopped. At this time, a bottom face 11b of the large-size tape cassette 11 goes onto the slant faces 44 and then the top faces of the pair of small-cassette guides, whereby the pair of small cassette guides 39 escape, i.e., lower in the direction of arrow d to the side of the bottom face 34a" of the bottom plate 34a against the leaf springs 40. Thus, the large-size tape cassette 11 passes over the pair of small cassette guides 39 and is inserted in the direction of arrow e. When completion of the insertion of the large-size tape cassette 11 into the cassette holder 34 is detected by the sensor that is attached to the cassette holder 34, the pair of reel bases 22 on the mechanical deck 21 are instantaneously moved in the directions of arrows b as shown in FIG. 6, whereby the interval between the reel bases 22 is automatically adjusted to the large interval $L_2$ suitable for the large-size tape cassette 11.

After the completion of the insertion of the large-size tape cassette 11, as described above, the door 36 is pushed by a finger in the direction of arrow d as shown in FIG. 2B, whereby the cassette holder 34 is pressed (translated) in the direction of arrow d from the cassette input/output position $P_1$ to the cassette mounting position $P_2$ within the outer case 2 through the opening 3. Thus, the large-size tape cassette 11 is mounted on the mechanical deck 21 as shown in FIG. 6. The opening/closing lid 16 of the large-size tape cassette 11 is opened in the direction of arrow o by the lid opening/closing member, and the opening 3 of the outer case 2 is closed by the door 36 that has been slid in with respect to the cassette holder 34 in the direction of arrow f. In removing the large-size tape cassette 11, as shown in FIG. 2A, as described above, upon depression of the ejection button the cassette holder 34 is popped up (translated) in the direction of arrow c by the pop-up mechanism from the cassette mounting position $P_2$ to the cassette input/output position $P_1$ through the opening 3. At the same time, as described above, the door 36 is slid with respect to the cassette holder 34 in the direction of arrow e, whereby the cassette input/output mouth 35 of the cassette holder 34 is opened widely.

In the above-configured cassette container to which the invention is not applied, as shown in FIG. 7, to adjust the interval between the pair of reel bases 22 to the small interval $L_1$ for the small-size tape cassette 12 or the large interval $L_2$ for the large-size tape cassette 11, the pair of reel bases 22 are reciprocated in the directions of arrows a and b by causing them to make symmetrical circular movements about the pair of brake drums 26. On the other hand, since the front end 12a and the center in the right-left direction of the small-size tape cassette 12 are positioned at the insertion reference positions on the horizontal and vertical reference lines X and Y, respectively, on the bottom plate 34a of the cassette holder 34, the installation area of the pair of small cassette guides 39 on the bottom plate 34a is restricted. As indicated by chain lines in FIG. 7, since the pair of small cassette guides 39 are disposed right over the pair of brake drums 26, the brake drums 26 obstruct the small cassette guides 33 when the cassette holder 34 lowers to the cassette mounting position $P_2$.

Further, as shown in FIGS. 3A and 3B, when the small-size tape cassette 12 is inserted into the cassette holder 34, it is desired that the pair of stopper insertion grooves 12b be smoothly engaged with the small cassette stoppers 46 of the pair of small cassette guides 39 in the direction of arrow e and that the front end 12a of the small-size tape cassette 12 be correctly positioned on the horizontal reference line x by the pair of small cassette stoppers 46. As shown in FIGS. 4A and 4B, when the large-size tape cassette 11 is inserted into the cassette holder 34, it is desired that the bottom face 11b of the large-size tape cassette 11 cause the pair of small cassette guides 39 to smoothly escape to the side of the bottom face 34a" of the bottom plate 34a. To these ends, as shown in FIG. 11B, it is preferable that each of the small cassette guides 39 be set so as to be inclined from the bottom plate 34a along the cassette inserting direction of arrow e to have an elevation angle $\theta_1$ in the state that the pair of small cassette guides 39 are protruded to the side of the top face 34a' of the bottom plate 34a in the direction of arrow c by the height $H_1$.

On the other hand, as shown in FIGS. 10–12, each of leaf springs 40 which are arranged symmetrically at the right and left positions to support the pair of small cassette guides 39 is usually configured such that a front leaf spring portion 40a and a rear leaf spring portion 40b for supporting a front portion 39A and a rear portion 39B of each small cassette guide 39, respectively (the terms "front" and "rear" are defined in the cassette inserting direction of arrow e) extend from a base portion 40c to become two branches. The base portion 40c is fixed to the bottom face 39c of the associated small cassette guide 39 by welding or the like, while free end portions 40d and 40e as outside end portions of the front and rear leaf spring portions 40a and 40b, respectively, are fixed to the bottom face 34a" of the bottom plate 34a by means of the pair of caulking pins 41. If the front and rear leaf spring portions 40a and 40b are simply given the same width $W_1$ and length $L_3$, they have the same resilient force. Thus, as shown in FIGS. 11A–11B and 12, the leaf spring 40 causes the associated small cassette guide 39 to be translated in the directions of arrows c and d between the top face 34a' side and the bottom face side 34a" of bottom plate 34a of the cassette holder 34 while maintaining the slanted posture with the elevation angle $\theta_1$. In this structure in which each small cassette guide 39 is translated in the directions of arrows c and d while maintaining the slanted posture with the elevation angle $\theta_1$, a movement stroke $S_1$ of the front portion 39A and the rear portion 39B becomes two to three times longer than a thickness $T_1$ of the small cassette guide 39.

As a result, as shown in FIGS. 9 and 11B, the height $H_2$ becomes very large which is an escape margin for the event that the large-size tape cassette 11 causes the small cassette guides 39 to escape to the side of the bottom face 34a" of the bottom plate 34a of the cassette holder 34 in the direction of arrow d, requiring a large interval between the bottom plate 34a and the mechanical deck 21 as explained below. The pair of brake drums 26 as obstacles are disposed right under the pair of small cassette guides 39 that escape to the side of the bottom face 34a" of the bottom plate 34a. A minimum clearance (escape margin) $H_3$ necessary to prevent the stopper pieces 45 and the front portions 39A from contacting (interfering with) the top portions of the brake drums 26 and an absolute height $H_4$ of the brake drums 26 with respect to the mechanical deck 21 need to be secured between the small cassette guides 39 and the mechanical deck 21. Therefore, the interval $S_2$, which is calculated as $S_2=H_2+H_3+H_4$, is made large by the height (escape margin) $H_2$. The interval $S_2$ is an important factor in thinning the video tape recorder 4. That is, a large interval $H_2$ causes a problem that the video tape recorder 4 is made thick.

SUMMARY OF THE INVENTION

The present invention has been made to solve the above problems in the art, and an object of the invention is therefore to provide a cassette container which can reduce an escape margin for an event that a large-size tape cassette causes small cassette guides to escape to a space under a bottom plate of a cassette holder.

According to the invention, there is provided a cassette container capable of accommodating plural kinds of cassettes of different sizes, comprising a plate for supporting a cassette to be mounted so as to be in contact with a surface thereof; a pair of cassette guides for guiding a cassette of a given size other than a maximum size among the plural kinds of cassettes of different sizes to a mounting position, the pair of cassette guides being provided so as to be lowered by a cassette larger than the cassette of the given size to a lower side of the plate when the larger cassette is inserted; a pair of leaf springs for urging the pair of cassette guides toward an upper side of the plate, respectively, wherein the pair of cassette guides are inclined toward a cassette insertion side when they move to the upper side of the plate being urged by the pair of leaf springs, and are rendered approximately parallel with the plate when are lowered to the lower side of the plate by insertion of the larger cassette.

In the above cassette container, each of the pair of leaf springs may have a front leaf spring portion and a rear leaf spring portion where the cassette insertion side is defined as a front side, the rear leaf spring portion having a resilient force weaker than the front leaf spring portion, wherein a difference in resilient force for urging the pair of cassette guides upward renders the pair of cassette guides approximately parallel with the bottom plate without inclination when the pair of cassette guides are lowered to the lower side of the plate by the larger cassette.

The rear leaf spring portion may have a narrower width than the front leaf spring portion. Alternatively, the rear leaf spring portion may have a longer length than the front leaf spring portion.

The above cassette container may further comprise stoppers for restricting a sinking length of front portions of the pair of cassette guides where the cassette insertion side is defined as a front side when the pair of cassette guides are lowered to the lower side of the plate by the larger cassette, whereby the pair of cassette guides are rendered approximately parallel with the plate without inclination.

BRIEF DESCRIPTION OF THE DRAWINGS

FIGS. 10A, B and C are respectively a plan view and two side sectional views showing a bottom plate of the cassette holder, small cassette guides, and leaf springs in the cassette container of FIGS. 1A–1B and 2A–2B;

FIGS. 16A, B and C are respectively a plan view and two side sectional views showing a bottom plate of the cassette holder, the small cassette guides, and leaf springs in the cassette container of the invention;

DETAILED DESCRIPTION OF THE PREFERRED EMBODIMENTS

Embodiments of the present invention will be hereinafter described with reference to FIGS. 13A–13C to 19A–19C. In these figures, the parts that are the same as or correspond to those in FIGS. 1A–1C to 12 are given the same reference symbols and redundant descriptions therefor will be omitted.

FIGS. 13A–13C to 16A–C show a first embodiment. A front leaf spring portion 40$a$ and a rear leaf spring portion 40$b$ of each of a pair of leaf springs 40 (arranged in the right-left direction) for supporting a pair of small cassette guides 39 (arranged in the right-left direction) extend from a base portion 40$c$, are curved into a U-shape, and are arranged approximately symmetrically at front and rear positions. Free end portions 40$d'$ and 40$e'$ of the front and rear leaf spring portions 40$a$ and 40$b$ which are close to the associated small cassette guide 39 are fixed to a bottom face 34$a''$ of a bottom plate 34$a$ by a pair of caulking pins 41. Because the front and rear spring portions 40$a$ and 40$b$ are curved into a U-shape, spring effective lengths $L_{11}$ and $L_{12}$ from the base portion 40$c$ to the free end portions 40$d$ and 40$e$, respectively, are made sufficiently large. In the illustrated example, $L_{11}=L_{12}$. As for the front leaf spring portion 40$a$, a pair of, i.e., inside and outside, spring pieces 40$a'$ and 40$a''$ that form the U-shape have the same width $W_{11}$. On the other hand, as for the rear leaf spring portion 40$b$, among a pair of, i.e., inside and outside, spring pieces 40$b'$ and 40$b''$ that form the U-shape, the inside spring piece 40$b'$ has a width $W_{12}$ that is narrower than a width $W_{11}$ of the outside spring piece 40$b''$. That is, a relationship $W_{11}>W_{12}$ holds. With this relationship, the front leaf spring portion 40$b$ for supporting a rear portion 39B of the associated small cassette guide 39 has resilient force $F_2$ that is weaker than resilient force $F_1$ of the front leaf spring portion 40$a$ for supporting a rear portion 39B of the small cassette guide 39. That is, $F_1>F_2$.

Figure 13A:
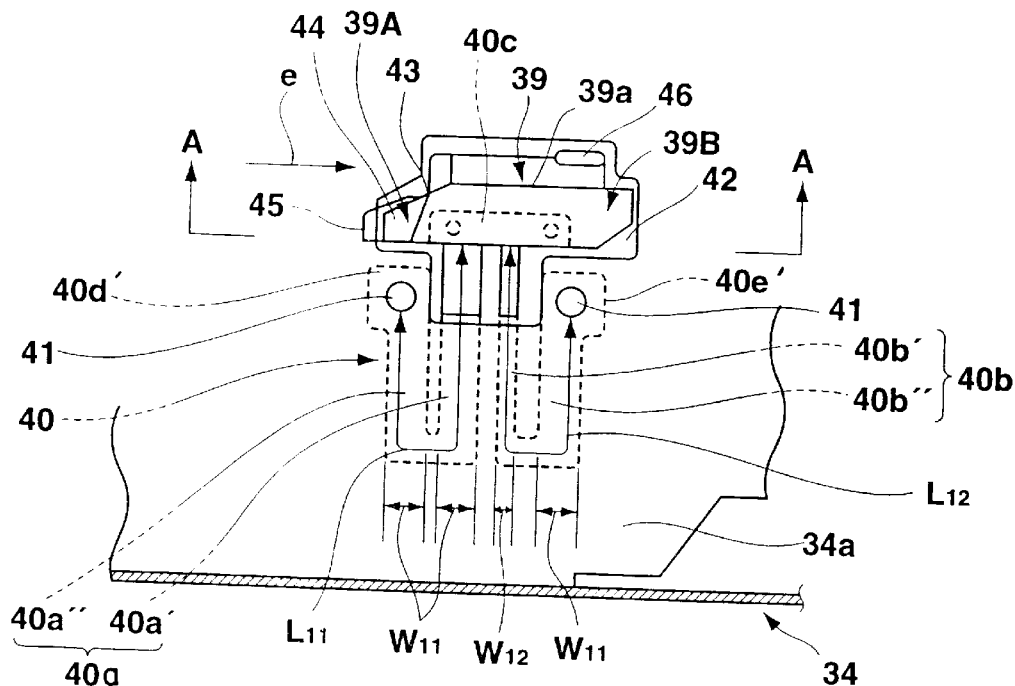
FIGS. 13A–13C are a partially cutaway plan view and side sectional views, respectively, showing the main part of a cassette container according to a first embodiment of the invention.
Figure 13B:
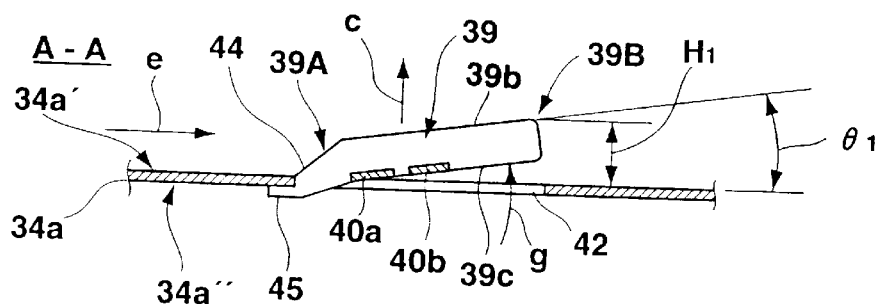

Therefore, according to the first embodiment, as shown in FIG. 13B, when each small cassette guide 39 is protruded by the associated leaf spring 40 to the side of a top face 34$a'$ of a bottom plate 34$a$ through an insertion hole 42 in the direction of arrow c by a height $H_1$, a stopper piece 45 of the front portion 39A of the small cassette guide 39 abuts against a bottom face 34$a''$ of the bottom plate 34$a$ in the direction of arrow c, thereby restricting the length of elevation of the front portion 39A of the small cassette guide 39 by the front leaf spring portion 40$a$ having strong resilient force $F_1$. The rear portion 39B of the small cassette guide 39 is elevated by rotating it about the stopper piece 45 in the direction of arrow g by the rear leaf spring portion 40$b$ having weak resilient force. Thus, the small cassette guide 39 is protruded to the side of the top face 34$a'$ of the bottom plate 34$a$ by the height $H_1$ while making a slanted posture with an elevation angle $\theta_1$ along the cassette inserting direction of arrow e.

Figure 13C:
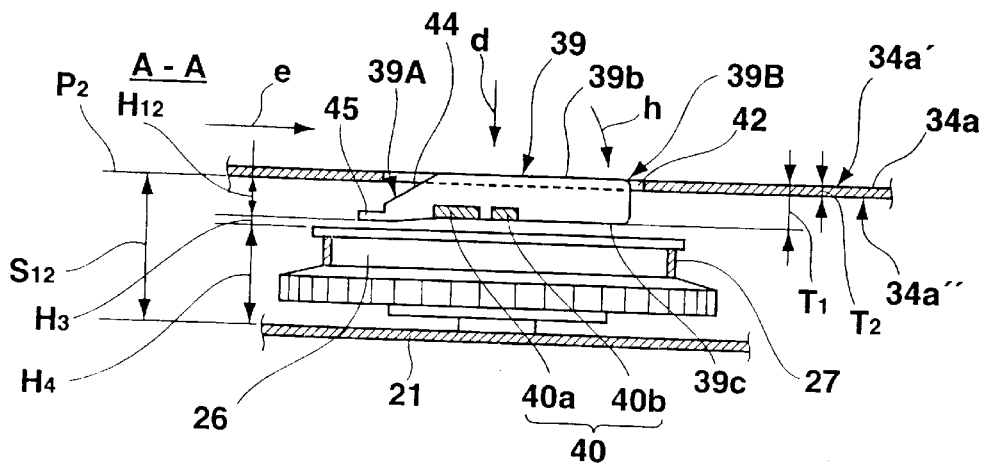
Figure 14:
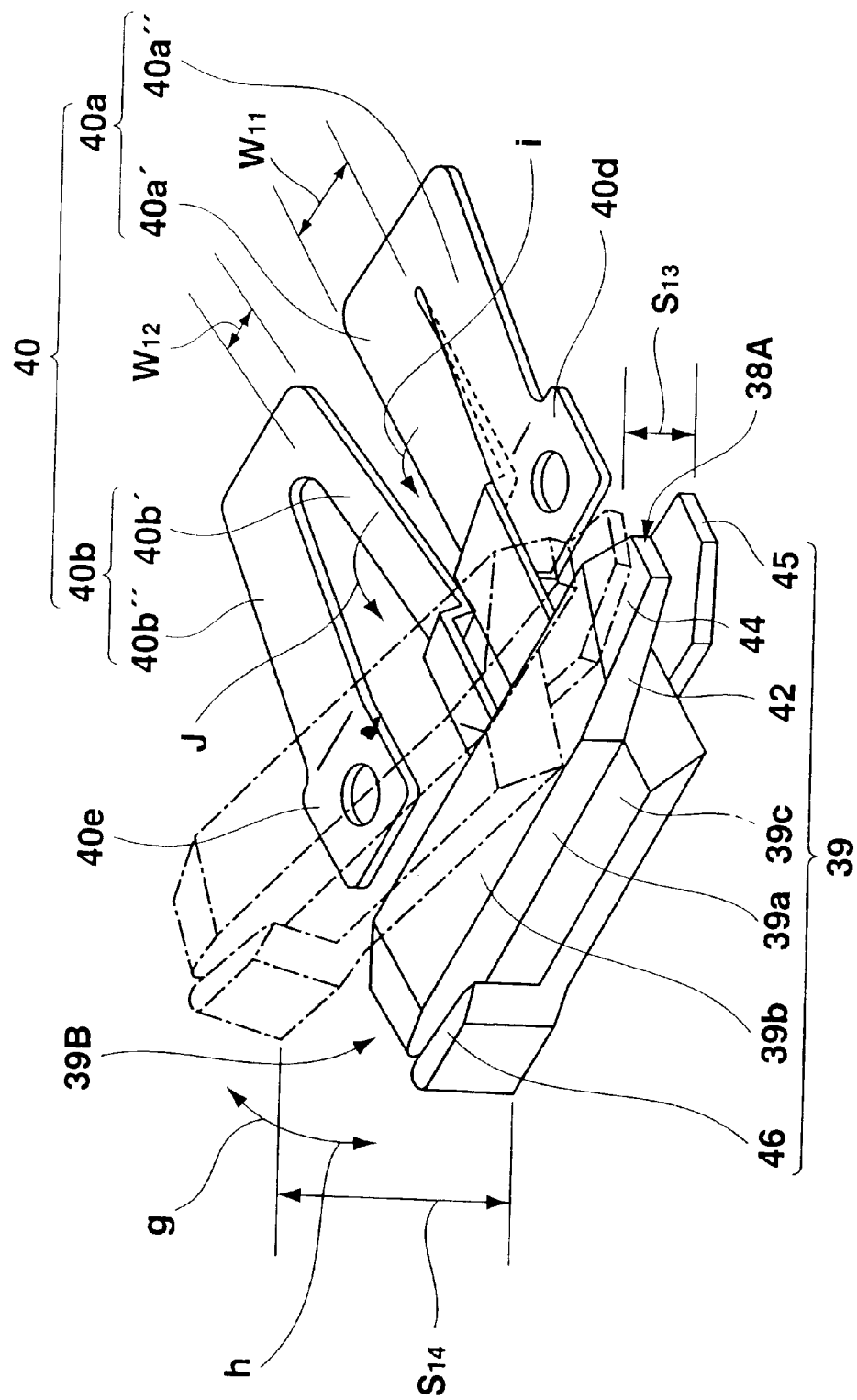
FIG. 14 is a perspective view showing the main part of FIGS. 13A–13C.
Figure 15:
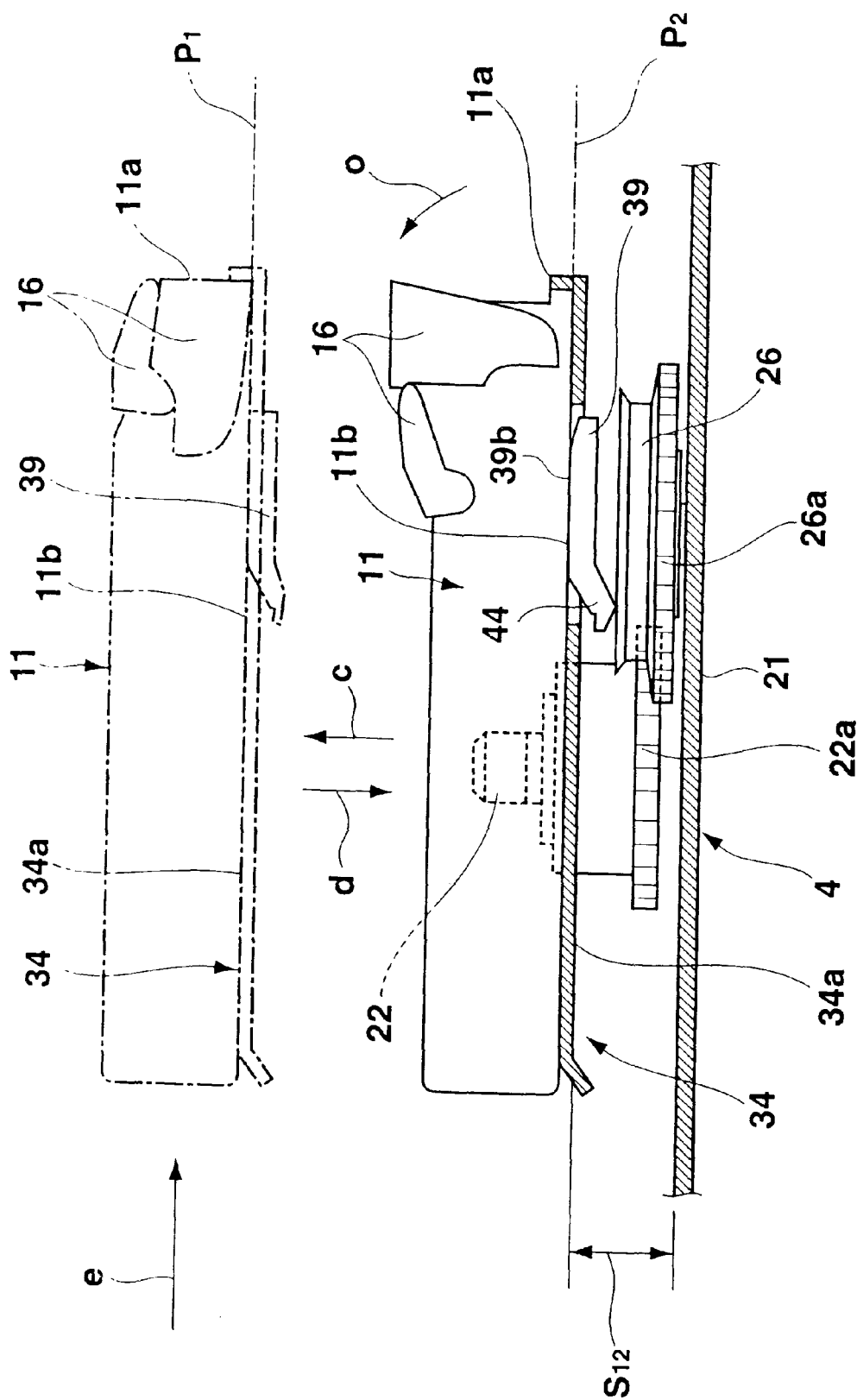
FIG. 15 is a partially cutaway side view showing an positional relationship between a small cassette guide and a brake drum in a state that a large-size tape cassette is mounted at a cassette mounting position by means of a cassette holder in the cassette container of the invention.

Next, a consideration will be given to a case where a large-size tape cassette 11 is inserted into the cassette holder 34 that is located at the cassette input/output position $P_1$ (indicated by chain lines in FIG. 15) and a bottom face 11$b$ of the large-size tape cassette 11 causes each small cassette guide 39 to escape to the side of the bottom face 34$a''$ of the bottom plate 34$a$ against the associated leaf spring 40 as shown in FIG. 13C. In this case, as shown in FIGS. 13C and 14, the sinking length in the direction of arrow d of the rear leaf spring portion 40$b$ having weak resilient force $F_2$ becomes longer than that of the front leaf spring portion 40$a$ having strong resilient force $F_1$. Therefore, twisting actions occur in the front and rear leaf spring portions 40$a$ and 40$b$ in the directions of arrow i and j, respectively, such that the twisting action in the direction of arrow i in the front leaf spring portion 40$a$ having strong resilient force $F_1$ is stronger than that in the direction of arrow j in the rear leaf spring portion 40$b$ having weak resilient force $F_2$. As a result, the rear portion 39B of the small cassette guide 39 rotates in the direction of arrow h, so that a movement stroke $S_{14}$ in the direction of arrow d of the rear portion 39B of the small cassette guide 39 becomes longer than a movement stroke $S_{13}$ in the direction of arrow d of the front portion 39A. When the small cassette guide 39 has completely escaped in the direction of arrow d to the side of the bottom face 34$a''$ of the bottom plate 34$a$, the small cassette guide 39 is rendered approximately parallel with the bottom plate 34$a$. That is, as the small cassette guide 39 escapes in the direction of arrow d to the space under the bottom plate 34$a$, the posture of the small cassette guide 39 is automatically changed from the slanted posture (see FIG. 13B) to the posture approximately parallel with the bottom plate 34 (see FIG. 13C) with the elevation angle $\theta_1$ canceled by the rotation of the rear portion 39B in the direction of arrow h.

Figure 1A:
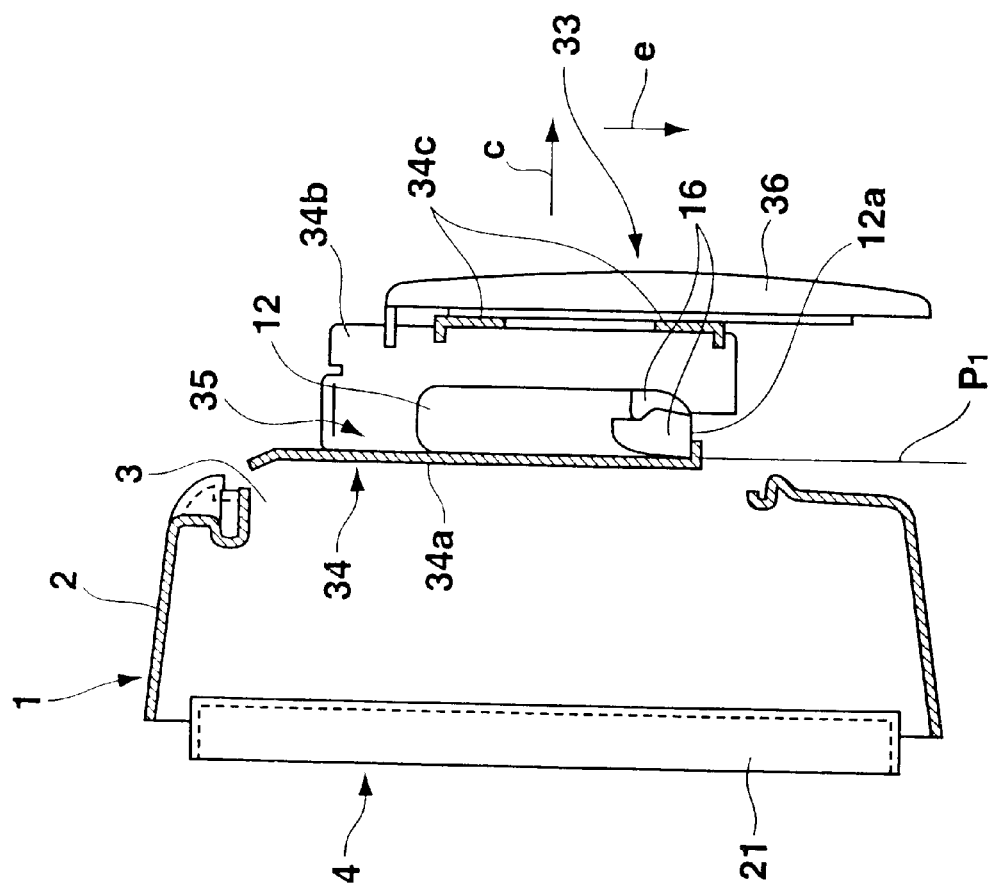
FIGS. 1A and 1B are partially cutaway side views showing how a small-size tape cassette is mounted and removed by means of a cassette holder in a cassette container to which the present invention is not applied.
Figure 1B:
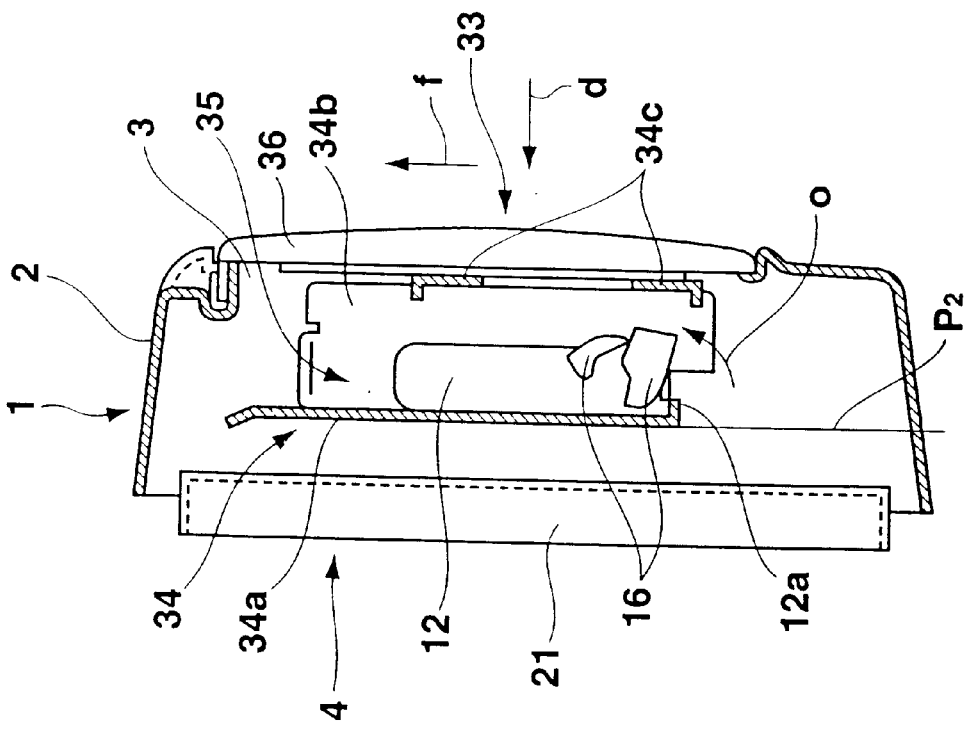
Figure 2A:
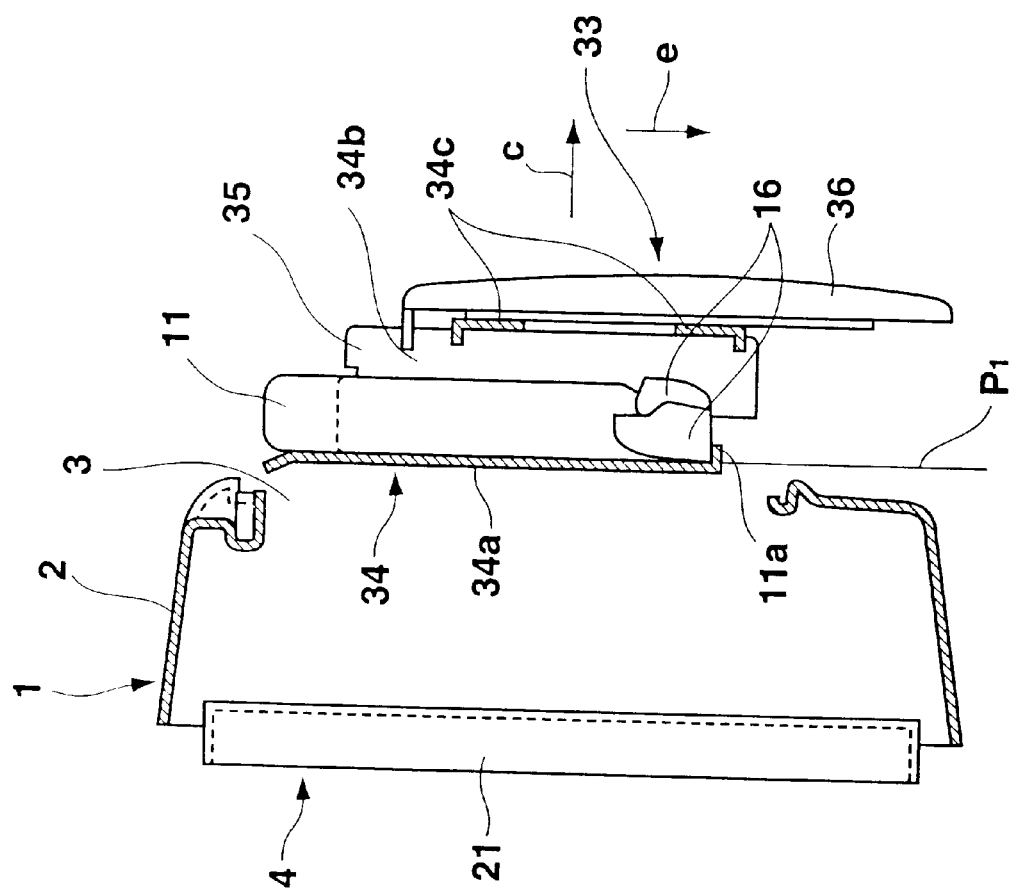
FIGS. 2A and 2B are partially cutaway side views showing how a large-size tape cassette is mounted and removed by means of the cassette holder in the cassette container to which the present invention is not applied.
Figure 2B:
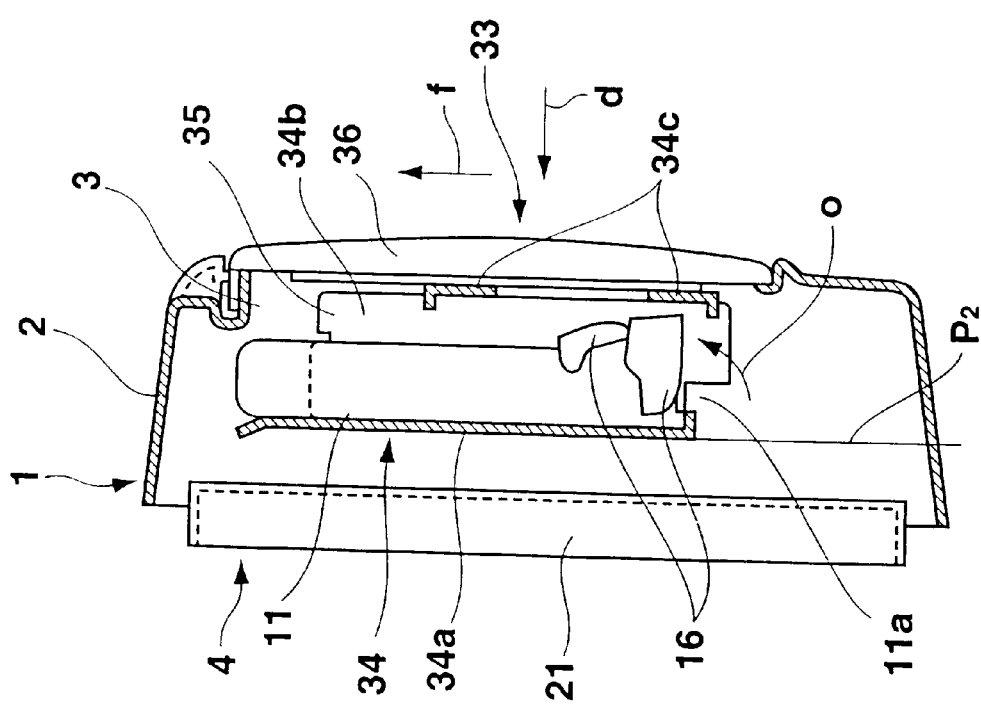
Figure 3A:
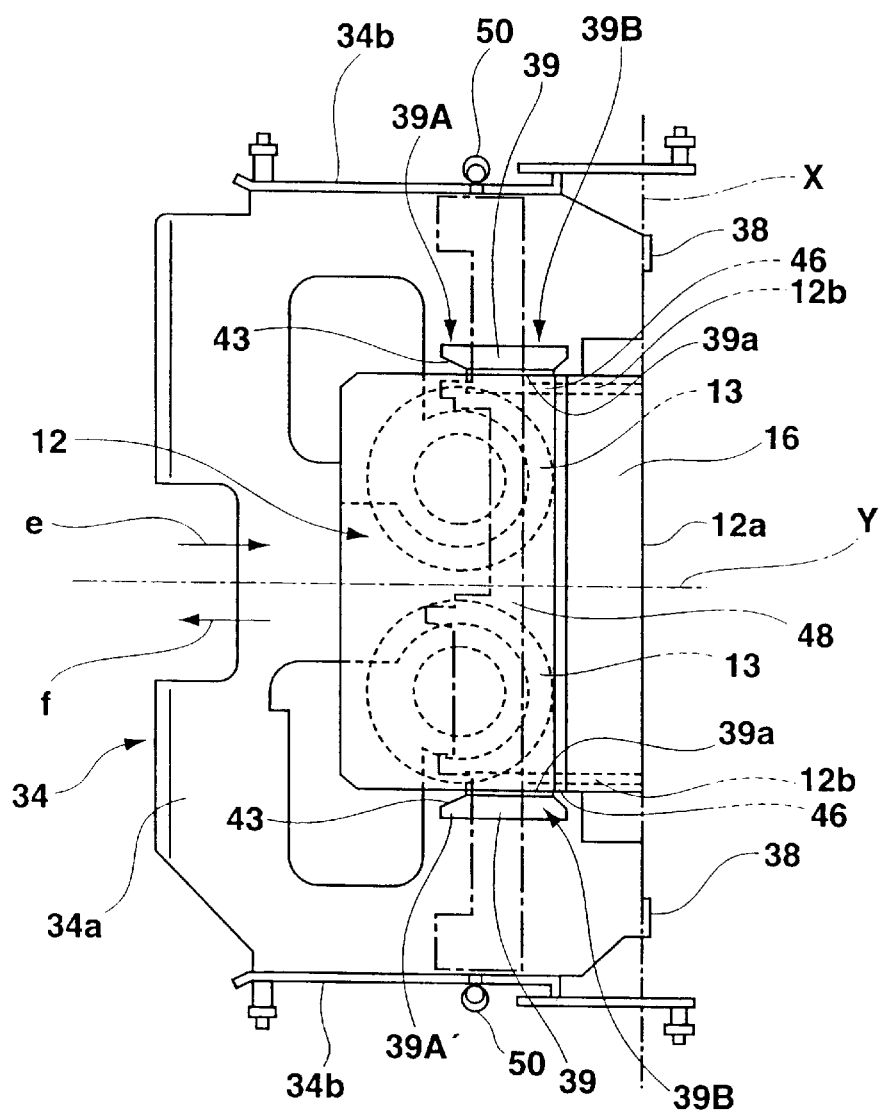
FIGS. 3A and 3B are a plan view and a side sectional view, respectively, showing a state that the small-size tape cassette is inserted in the cassette holder in the cassette container of FIGS. 1A–1B and 2A–2B.
Figure 3B:
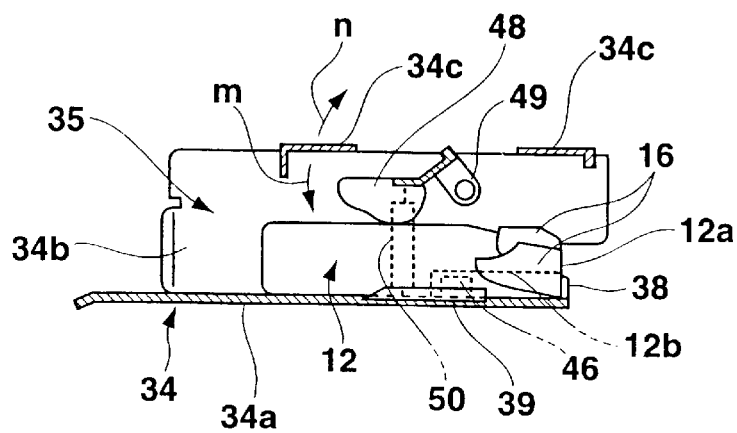
Figure 4A:
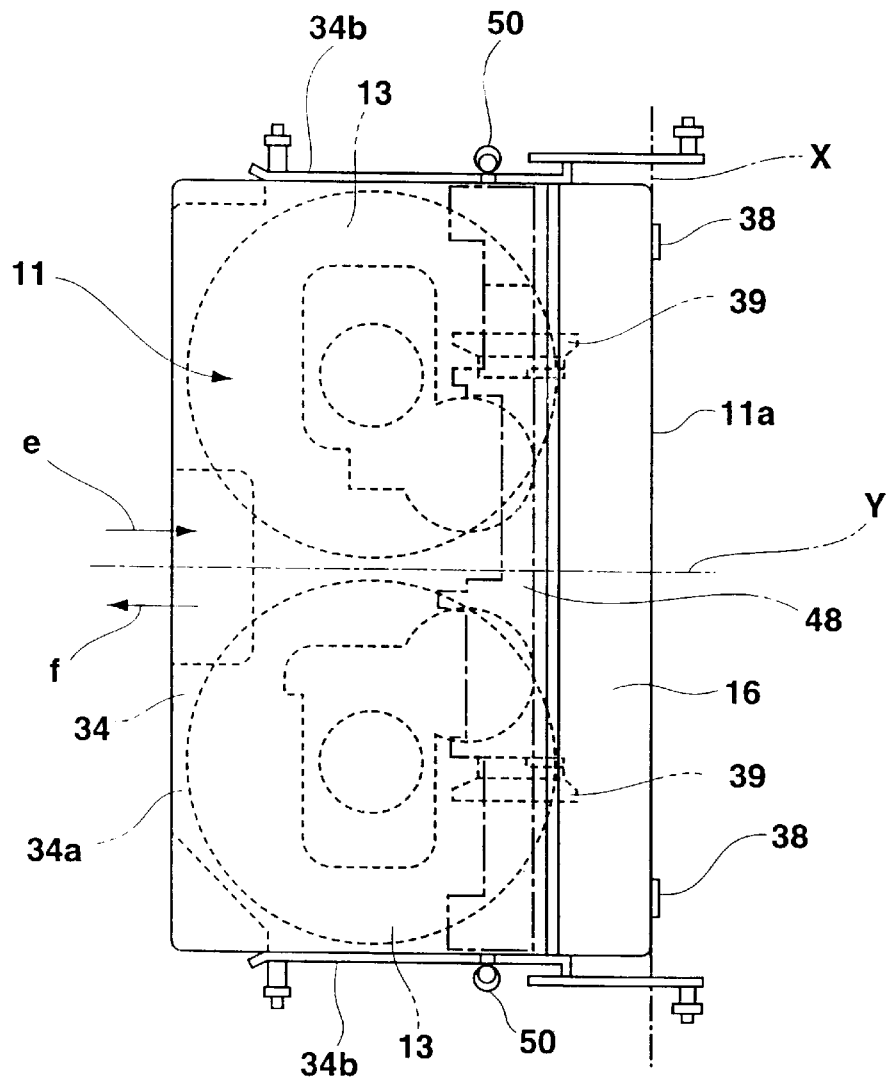
FIGS. 4A and 4B are a plan view and a side sectional view, respectively, showing a state that the large-size tape cassette is inserted in the cassette holder in the cassette container of FIGS. 1A–1B and 2A–2B.
Figure 4B:
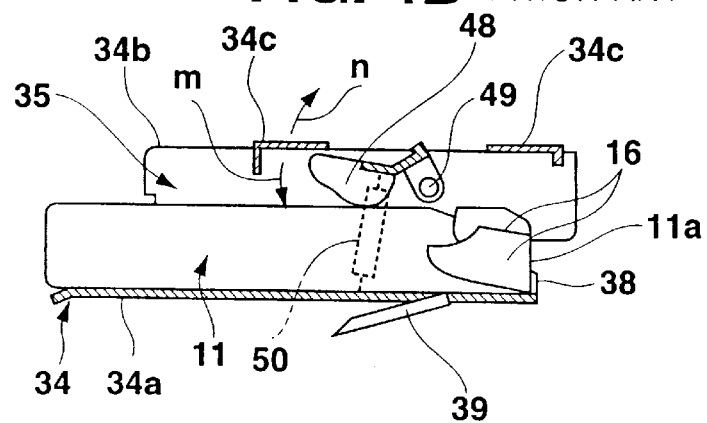
Figure 5:
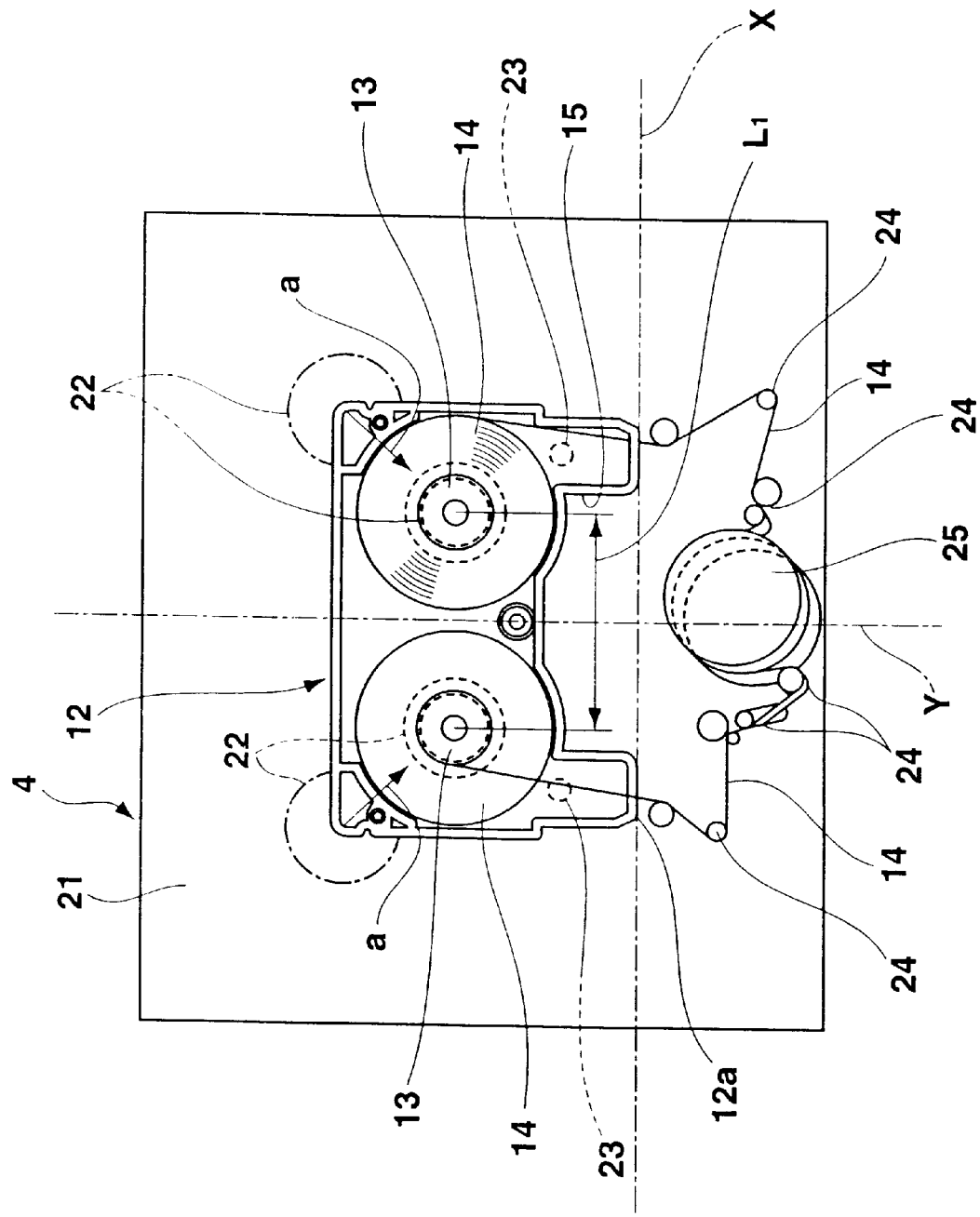
FIG. 5 is a plan view showing how the small-size tape cassette is mounted at a cassette mounting position and a tape is loaded in the cassette container of FIGS. 1A–1B and 2A–2B.
Figure 6:
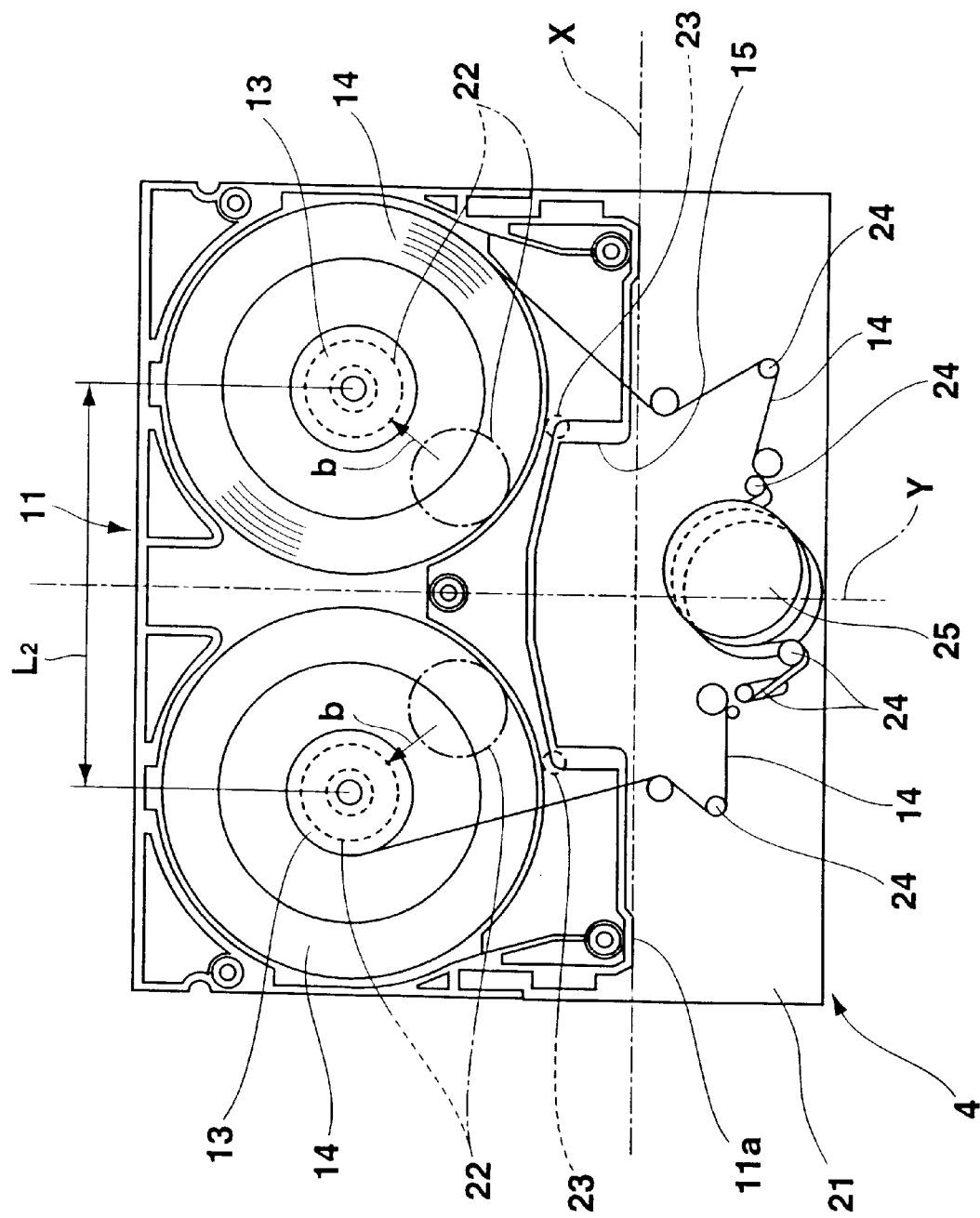
FIG. 6 is a plan view showing the large-size tape cassette is mounted at a cassette mounting position and a tape is loaded in the cassette container of FIGS. 1A–1B and 2A–2B.
Figure 7:
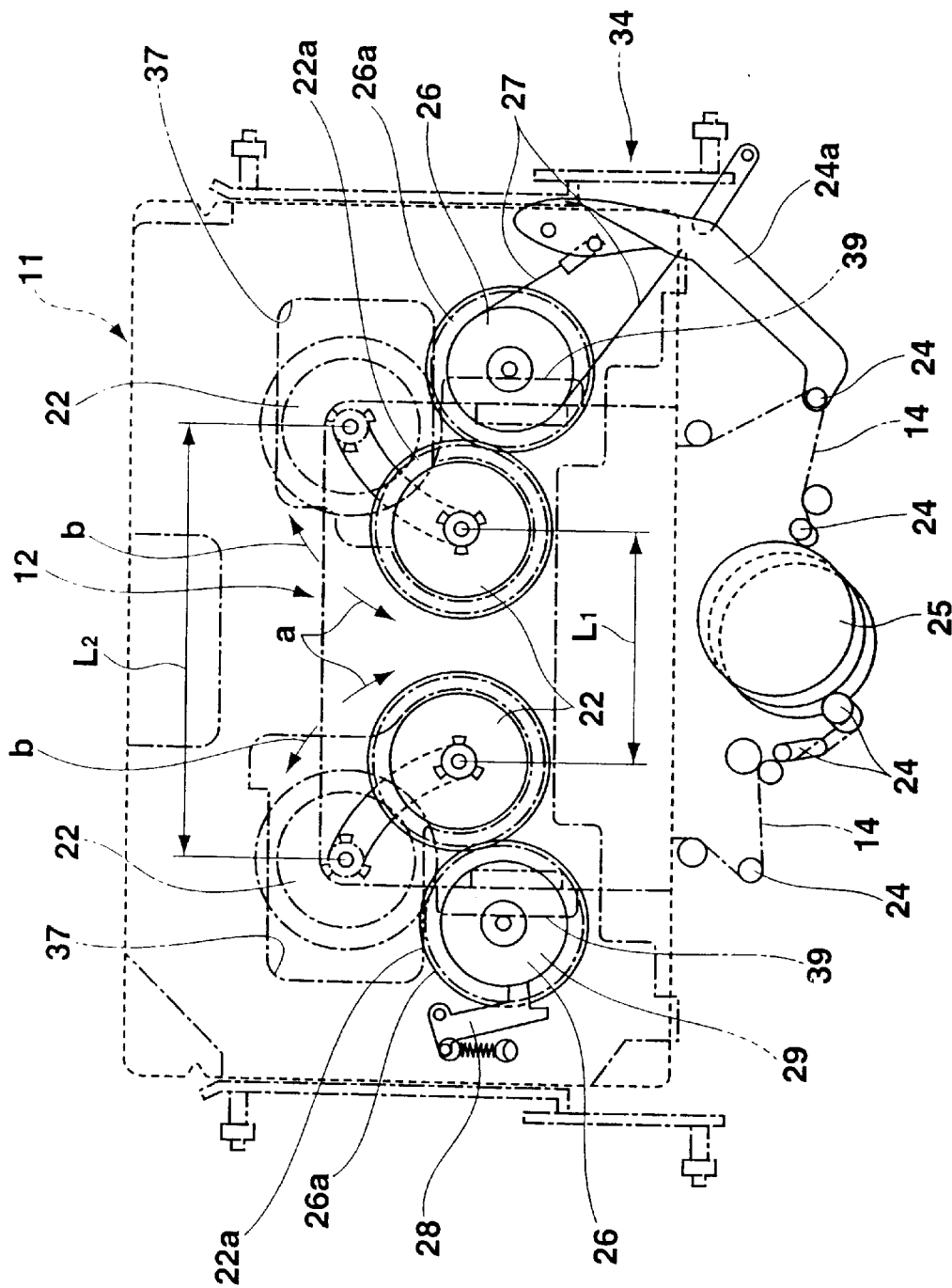
FIG. 7 is a plan view showing a layout of a pair of reel bases, a pair of brake drums, the cassette holder, and the small-size tape cassette in the cassette container of FIGS. 1A–1B and 2A–2B.
Figure 8:
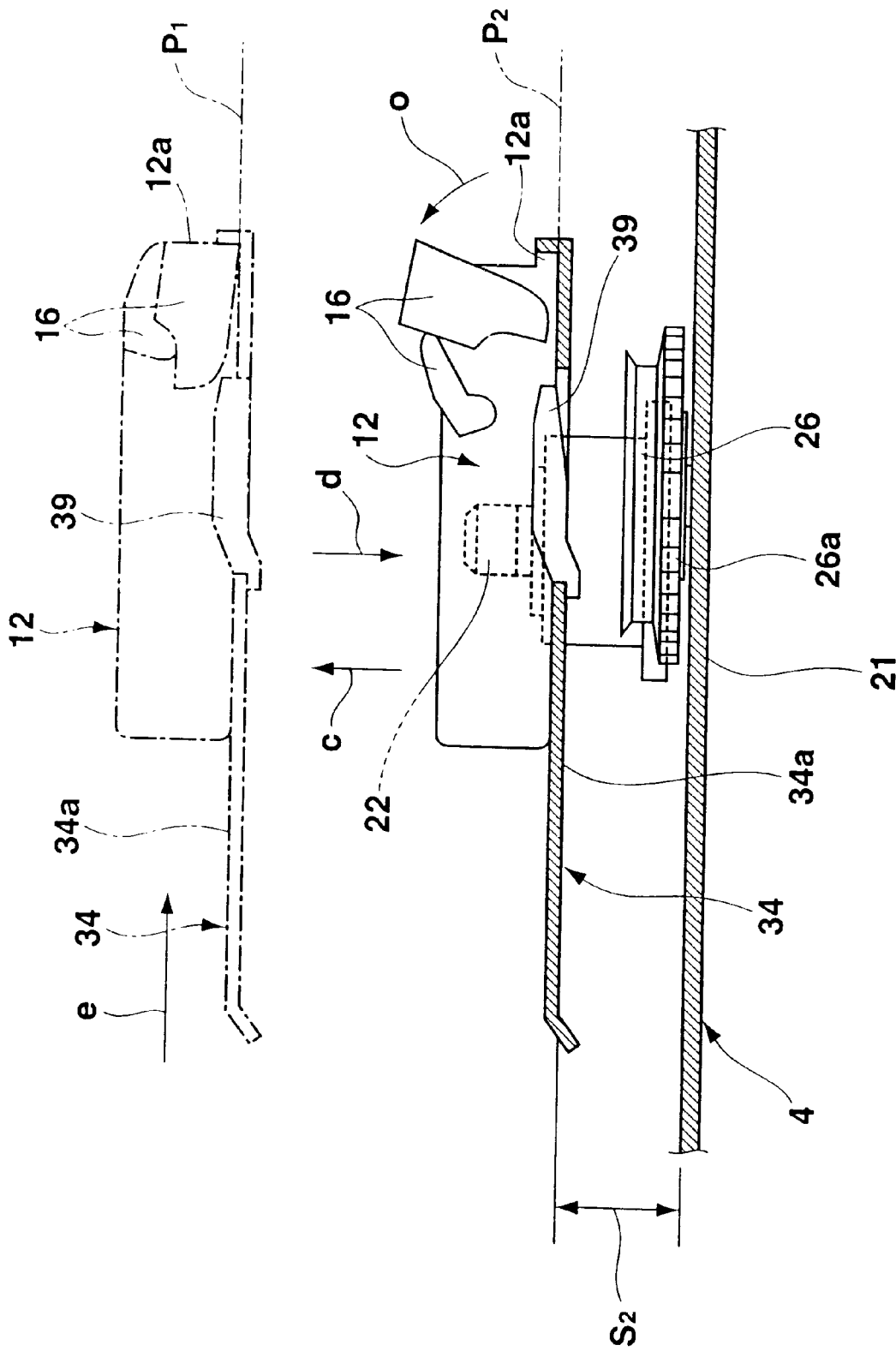
FIG. 8 is a partially cutaway side view showing how the small-size tape cassette is mounted at the cassette mounting position by means of the cassette holder in the cassette container of FIGS. 1A–1B and 2A–2B.
Figure 9:
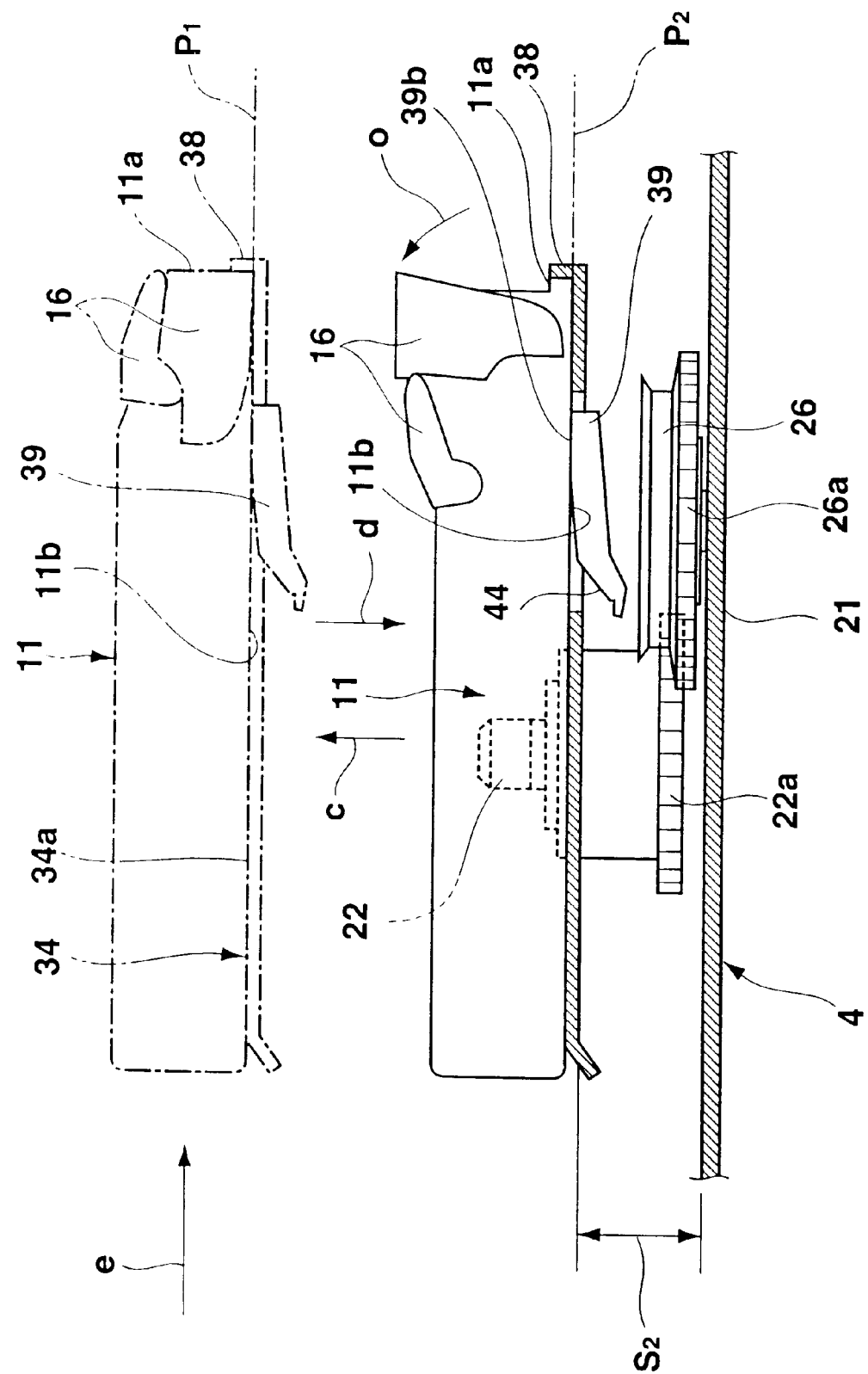
FIG. 9 is a partially cutaway side view showing how the large-size tape cassette is mounted at the cassette mounting position by means of the cassette holder in the cassette container of FIGS. 1A–1B and 2A–2B.
Figure 11A:
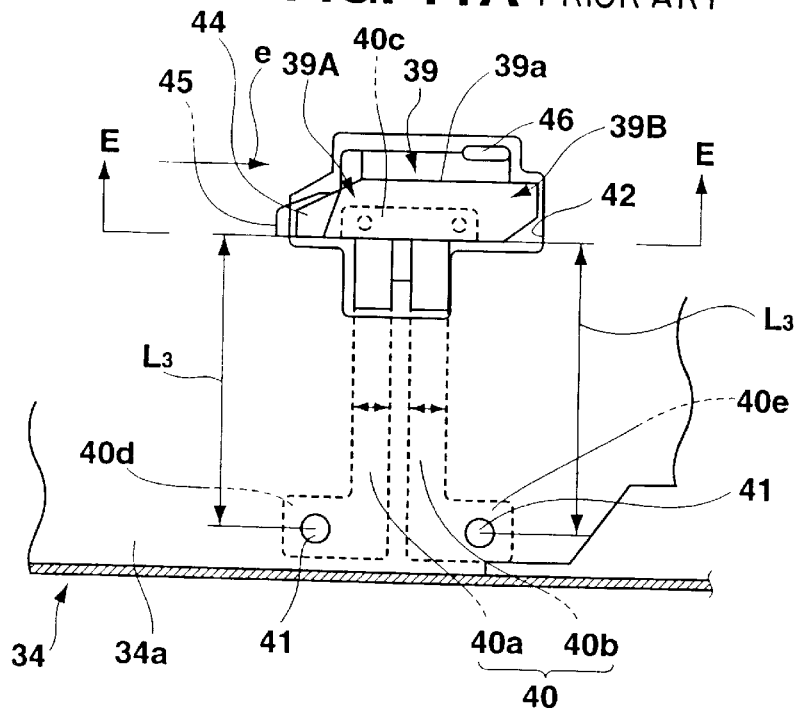
FIGS. 11A–11C are a partially cutaway plan view and side sectional views, respectively, showing the main part of the cassette container of FIGS. 1A–1B and 2A–2B.
Figure 11B:
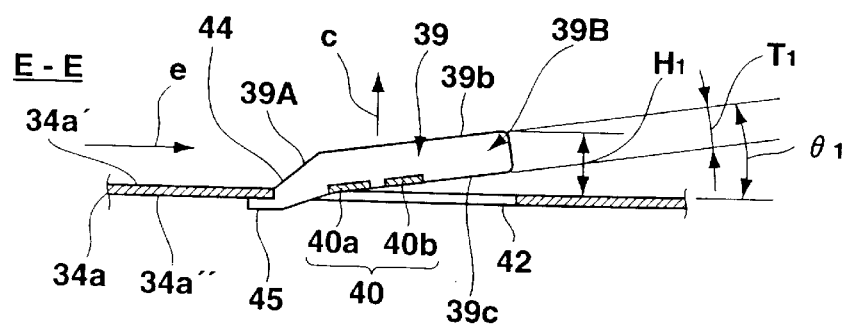
Figure 11C:
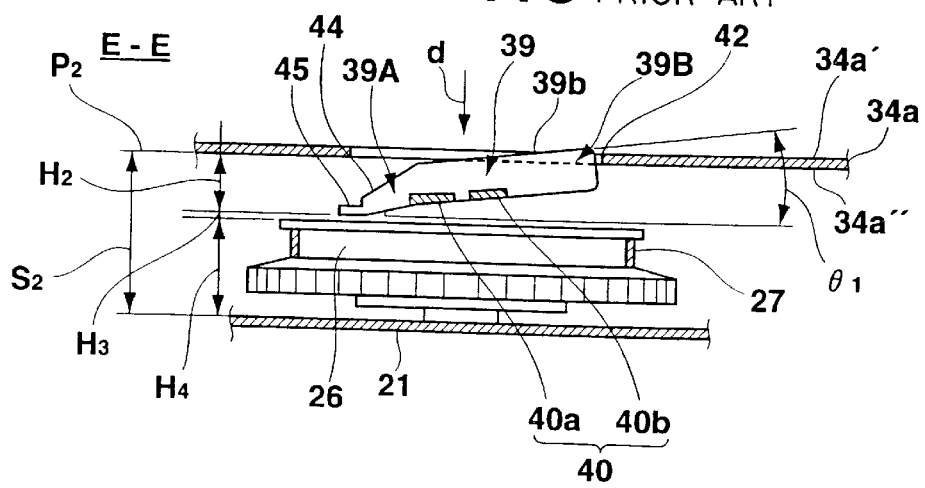
Figure 12:
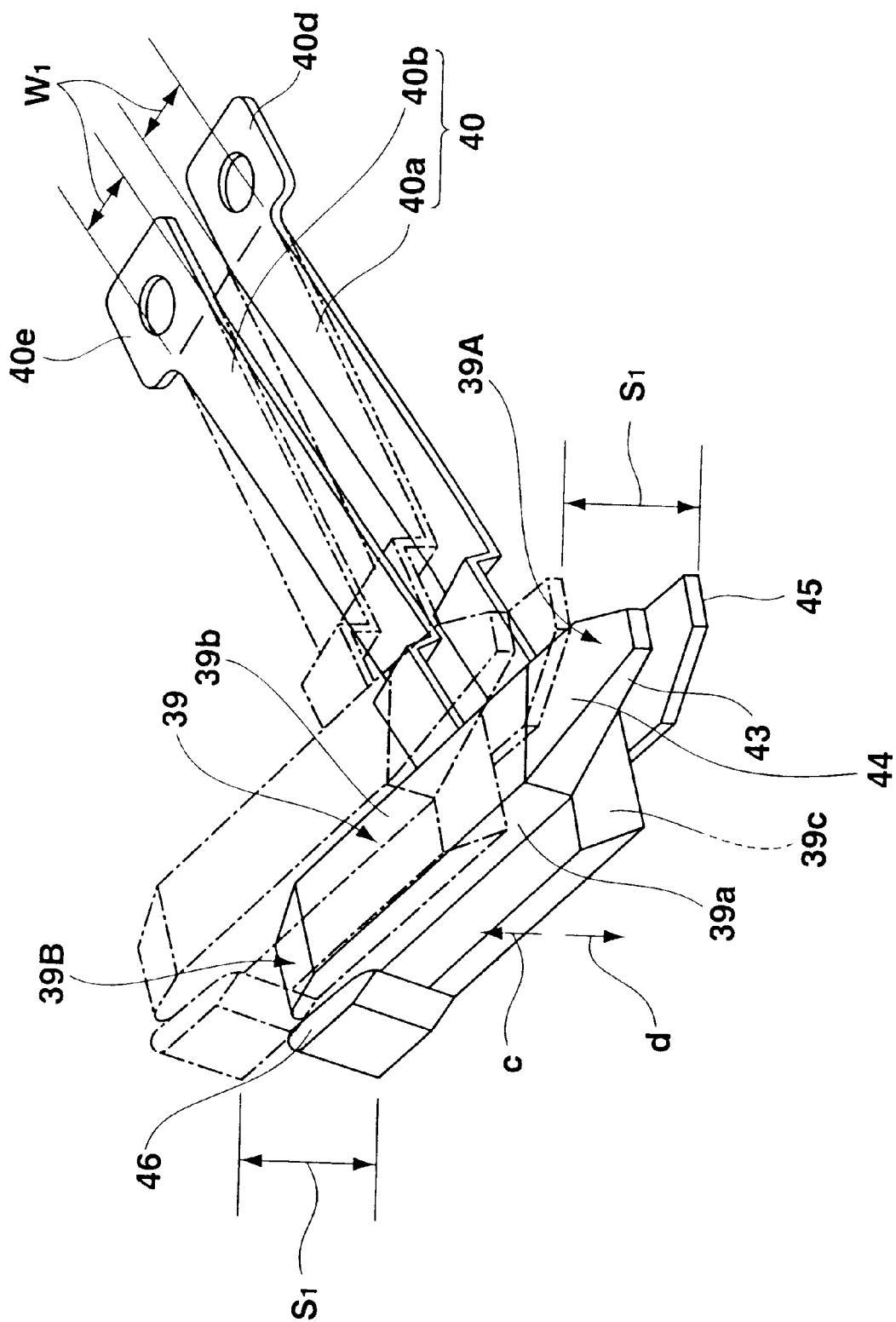
FIG. 12 is a perspective view showing the main part of FIG. 11.

Since the small cassette guide 39 is rendered approximately parallel with the bottom plate 34$a$ when it escapes in the direction of arrow d to the space under the bottom plate as shown in FIG. 13C, a height $H_{12}$ as an escape margin of the small cassette guide 39 under the bottom plate 34$a$ becomes approximately equal to a thickness $T_1$ of the small cassette guide 39 minus a thickness of the bottom plate 34$a$. That is, $H_{12}=T_1-T_2$. The height $H_{12}$ is ½ to ⅓ of the height $H_2$ shown in FIG. 11C and is therefore very low. That is, $H_{12}<H_2$. After completion of the insertion of the large-size tape cassette 11 into the cassette holder 34 (indicated by chain lines in FIG. 15), the cassette holder is lowered (translated) in the direction of arrow d (indicated by solid lines in FIG. 15). In this state, an interval $S_{12}$ between the bottom plate 34a of the cassette holder 34 and the mechanical deck 21 is calculated as $H_{12}+H_3+H_4$, which is much smaller than the interval $S_2$ shown in FIG. 11C. This makes it possible to greatly reduce the thickness of a video tape recorder 4.

Second to sixth embodiments of the invention will be hereinafter described with reference to FIGS. 17A–17B to 19A–19C.

Figure 17A:
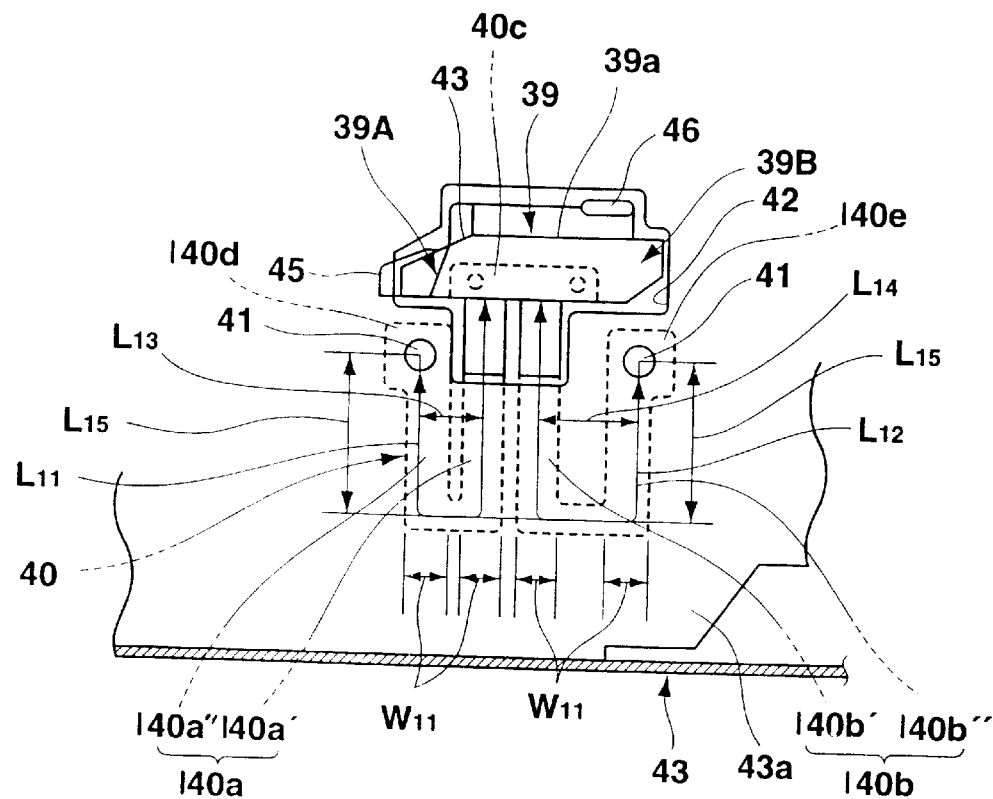
FIGS. 17A and 17B are partially cutaway plan views showing the main parts of cassette containers according to second and third embodiments of the invention, respectively.

In the second embodiment shown in FIG. 17A, all of a pair of, i.e., inside and outside, spring pieces 140a' and 140a" of an approximately U-shaped front leaf spring portion 140a and a pair of, i.e., inside and outside, spring pieces 140b' and 140b" of an approximately U-shaped rear leaf spring portion 40b of each leaf spring 40 have the same width $W_{11}$. On the other hand, an interval $L_{14}$ between the pair of spring pieces 140b' and 140b" of the rear leaf spring portion 140b is made larger than an interval $L_{13}$ between the pair of spring pieces 140a' and 140a" of the front leaf spring portion 40a. Thus, a spring effective length $L_{12}$ of the rear leaf spring portion 140b is made longer than a spring effective length $L_{11}$ of the front leaf spring portion 40a, whereby resilient force $F_2$ of the rear leaf spring portion 140b is made weaker than resilient force $F_1$ of the front leaf spring portion 40a.

Figure 17B:
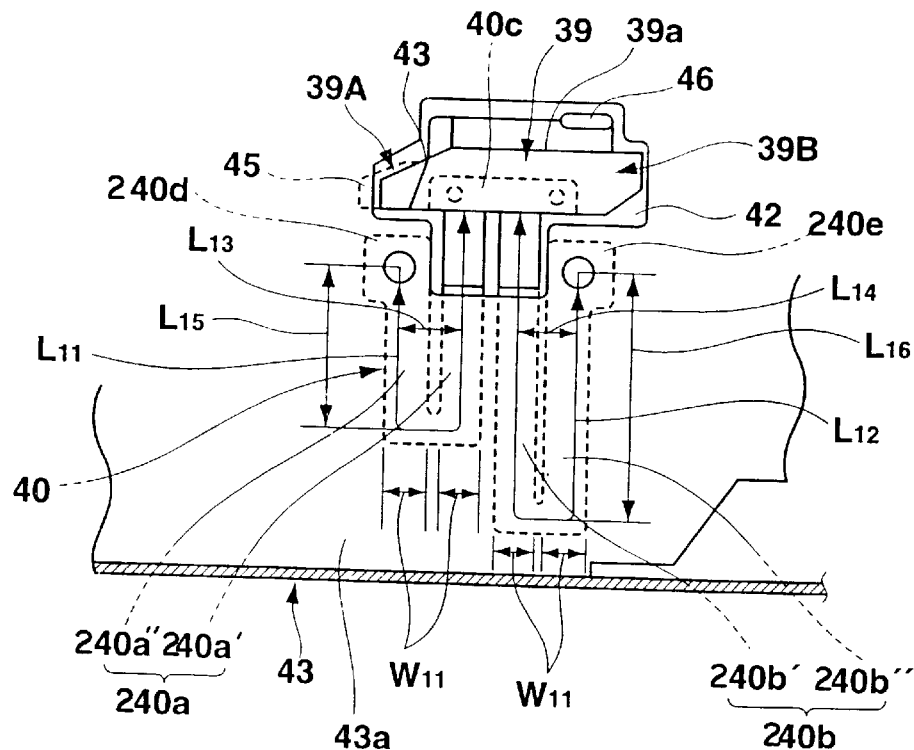

In the third embodiment shown in FIG. 17B, all of a pair of, i.e., inside and outside, spring pieces 240a' and 40a" of an approximately U-shaped front leaf spring portion 240a and a pair of, i.e., inside and outside, spring pieces 240b' and 240b" of an approximately U-shaped rear leaf spring portion 240b of each leaf spring 40 have the same width $W_{11}$. Further, the interval between the pair of spring pieces 240b' and 240b" of the rear leaf spring portion 240b and the interval between the pair of spring pieces 240a' and 240a" of the front leaf spring portion 240a are made the same ($L_{13}$). On the other hand, a length $L_{16}$ from the bending point of the pair of spring pieces 240b' and 240b" of the rear leaf spring portion 240b to a free end portion 40e is made longer than a length $L_{15}$ from the bending point of the pair of spring pieces 240a' and 240a" of the front leaf spring portion 240a to a free end portion 240d. Thus, a spring effective length $L_{12}$ of the rear leaf spring portion 240b is made longer than a spring effective length $L_{11}$ of the front leaf spring portion 240a, whereby resilient force $F_2$ of the rear leaf spring portion 240b is made weaker than resilient force $F_1$ of the front leaf spring portion 240a.

Figure 18A:
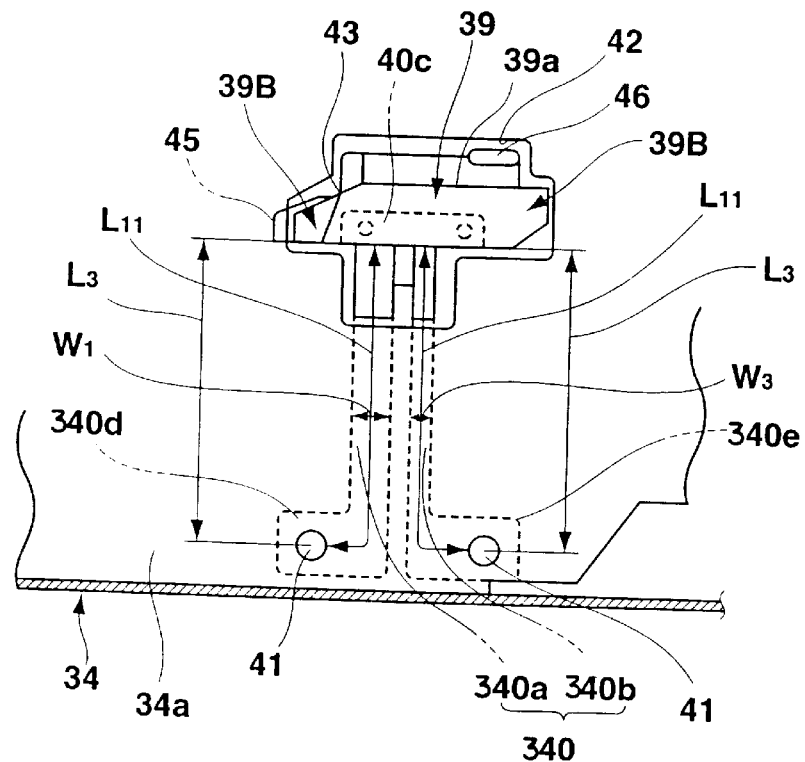
FIGS. 18A and 18B are partially cutaway plan views showing the main parts of cassette containers according to fourth and fifth embodiments of the invention, respectively.

In the fourth embodiment shown in FIG. 18A, the lengths of front and rear leaf spring portions 340a and 340b of each leaf spring 340 are made the same ($L_3$) and hence the spring effective lengths of the spring portions 340a and 340b are also made the same ($L_{11}$). On the other hand, a width $W_2$ of the rear leaf spring portion 340b is made narrower than a $W_1$ of the front leaf spring portion 340b, whereby resilient force $F_2$ of the rear leaf spring portion 340b is made weaker than resilient force $F_1$ of the front leaf spring portion 340a.

Figure 18B:
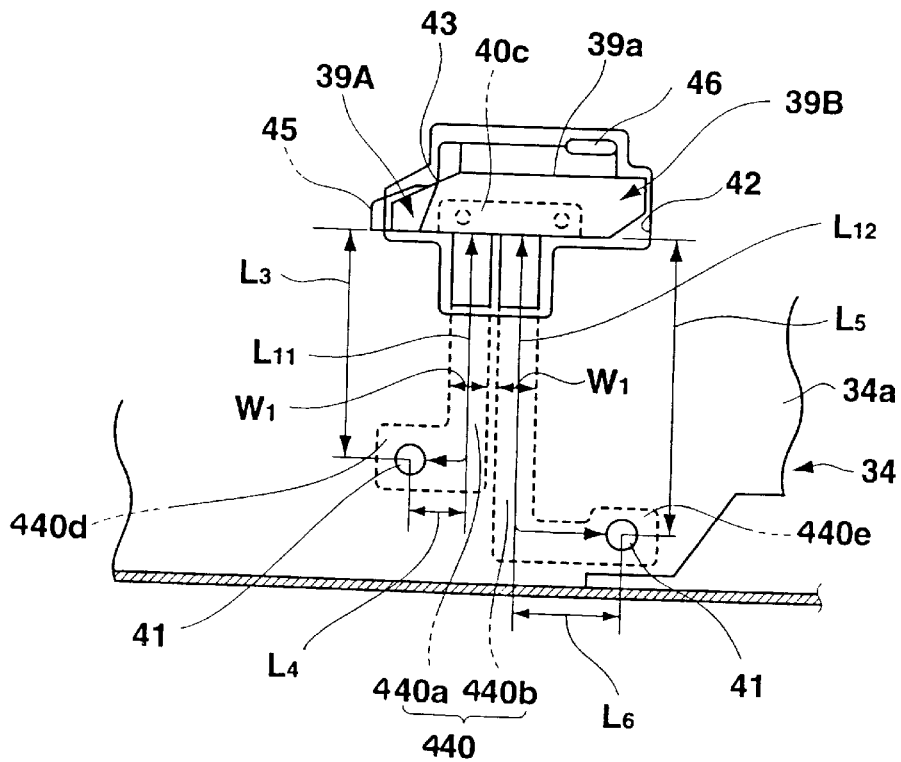

In the fifth embodiment shown in FIG. 18B, the widths of front and rear leaf spring portions 440a and 440b of each leaf spring 440 are made the same ($W_1$). On the other hand, a length $L_5+L_6$ of the front leaf spring portion 440a is made longer than a length $L_3+L_4$ of the front leaf spring portion 440a, whereby resilient force $F_2$ of the rear leaf spring portion 440b is made weaker than resilient force $F_1$ of the front leaf spring portion 440a.

In the above-described first to fifth embodiments, the resilient force $F_1$ of the front leaf spring portion 440a and the resilient force $F_2$ of the rear leaf spring portion 440b of each leaf spring 40 are given a difference ($F_1>F_2$). Thus, the second to fifth embodiments provide advantages equivalent to those of the first embodiment. To obtain a difference in resilient force ($F_1>F_2$), the shapes of the leaf spring 40 according to the first to fifth embodiments may be combined in various manners.

Figure 19A:
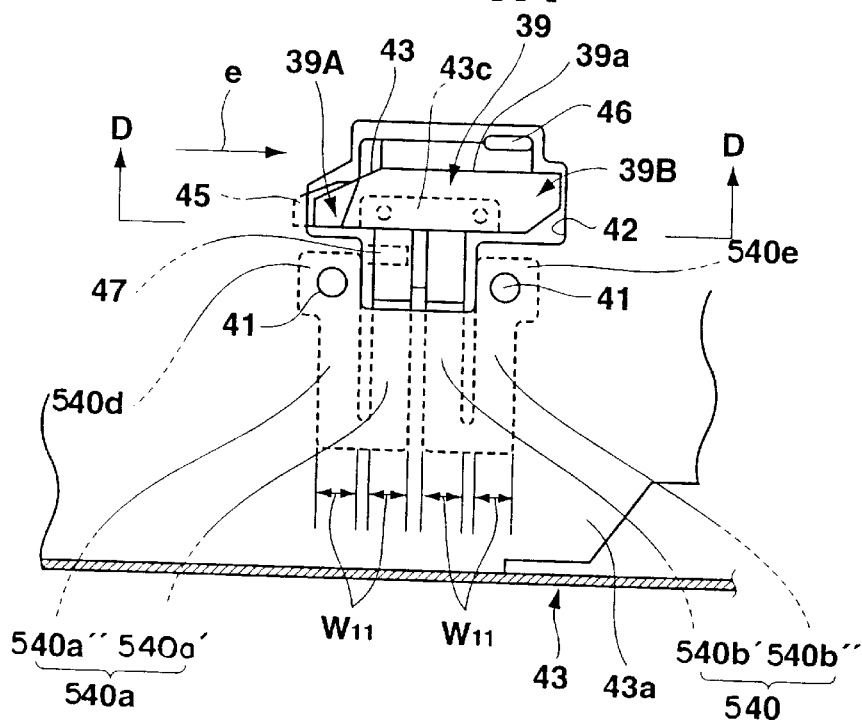
FIGS. 19A–19C are a partially cutaway plan view and side sectional views showing the main part of a cassette container according to a sixth embodiment of the invention.
Figure 19B:
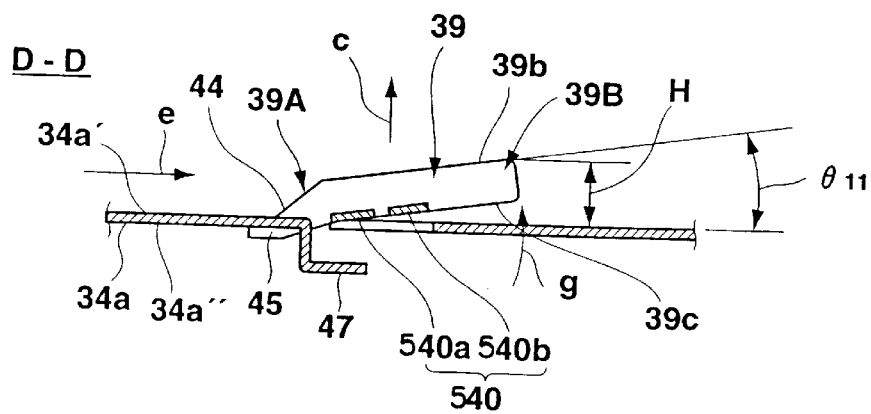
Figure 19C:
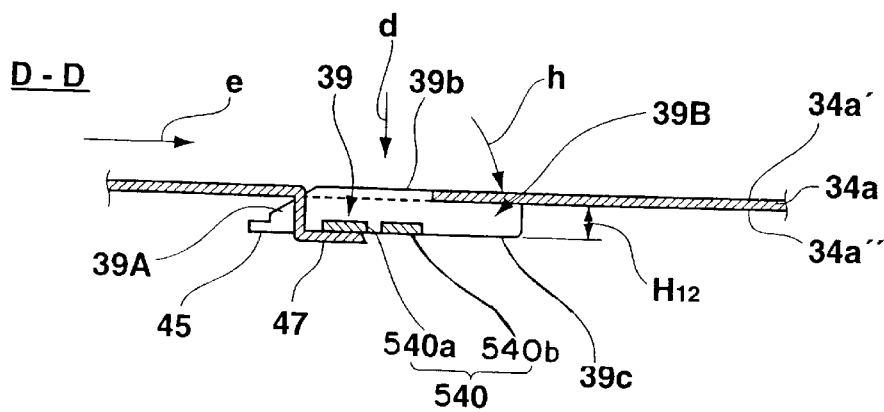

In the sixth embodiment shown in FIGS. 19A–19C, an escape length restricting stopper 47 is provided which restricts the length of the escape of the front portion 39A of each small cassette guide 39 in the direction of arrow d to the side of the bottom face 34a" of the bottom plate 34a of the cassette holder 34. In this case, when the large-size tape cassette 11 causes the small cassette guide 39 to escape against the leaf spring 540 in the direction of arrow d from the position where the small cassette guide 39 is protruded in the direction of arrow c above the bottom plate 34a by a height $H_1$ so as to be inclined with an elevation angle $\theta_1$ (see FIG. 19B) to the side of the bottom face 34a" of the bottom plate 34a (see FIG. 19C), the front leaf spring portion 540a of the leaf spring 540, for instance, abuts against the escape length restricting stopper 47. As a result, the escape length in the direction of arrow d of the front portion 39A of the small cassette guide 39 is restricted, whereby rear portion 39B of the small cassette guide 39 is mechanically rotated about the stopper 47 in the direction of arrow h. Thus, the posture of the small cassette guide 39 can reliably be changed to one in which the small cassette guide 39 is approximately parallel with the bottom plate 34a. Therefore, according to the sixth embodiment, the posture of the small cassette guide 39 can reliably be changed to one in which the small cassette guide 39 is approximately parallel with the bottom plate 34a irrespective of the shape of the leaf springs 40 to which the first to fifth embodiments are directed. However, the sixth embodiment may be combined with the shapes of the leaf springs 540 according to the first to fifth embodiment in various manners.

While the embodiments of the invention have been described above, the invention is not limited to those embodiments and various modifications are possible based on the technical concept of the invention.

Although the above embodiments are directed to the cassette container of a tape cassette that is applied to a video camera incorporating a video tape recorder, the invention is not limited to the tape cassette and entirely the same advantages can be obtained even with a disc cassette that accommodates a disc or a cassette that accommodates a semiconductor memory. That is, the invention provides the same advantages when applied to any apparatus that allows use of plural kinds of cassettes of different sizes. Further, the number of cassette sizes is not limited to two (large and small) but may be three (large, medium, and small) or more.

The above-described cassette container of a cassette type recording/playback apparatus according to the invention provides the following advantages.

When a pair of small cassette guides (arranged in the right-left direction) are urged and moved by a pair of leaf springs (arranged in the right-left direction) above the bottom plate of the cassette holder, the small cassette guides are inclined with respect to the bottom plate with an elevation angle along the cassette inserting direction. Therefore, in inserting a small tape cassette into the cassette holder, the small tape cassette can smoothly be engaged with the small cassette guides. In inserting a large tape cassette into the cassette holder, the large tape cassette causes the small cassette guides to smoothly escape to the space under the bottom plate of the cassette holder against the leaf springs.

Furthermore, when the large tape cassette inserted into the cassette holder causes the small cassette guides to escape to the space under the bottom plate of the cassette holder, the posture of the small cassette guides is changed so that they become parallel with the bottom plate with the elevation angle canceled, to thereby reduce the escape length of the small cassette guides under the bottom plate. Therefore, even if obstacles such as the brake drums are disposed right under the pair of small cassette guides escaping under the bottom plate when the large pate cassette that was inserted into the cassette holder at the cassette input/output position is mounted into the cassette mounting position by means of the cassette holder, the bottom plate can be made very close to the obstacles, thereby making it possible to greatly reduce the thickness of a cassette type recording/playback apparatus.

By giving a difference in resilient force between the front and rear leaf spring portions, the associated small cassette guide is inclined to have an elevation angle when it is moved to the space above the bottom plate and is rendered approximately parallel with the bottom plate when it escapes to the space under the bottom plate. This realizes a cassette type recording/playback apparatus that is simple in structure, can be manufactured easily, and has a low cost.

Further, by restricting the front side escape length of each small cassette guide by the stopper when the small cassette guide escapes to the space under the bottom plate, the posture of the small cassette guide is changed so that it becomes approximately parallel with the bottom plate. Therefore, the posture of the small cassette guide can be changed very reliably so that it becomes approximately parallel with the bottom plate. Thus, the reliability of operation is much improved.

What is claimed is:

1. A cassette container capable of accommodating plural kinds of cassettes of different sizes, comprising:

a plate having a contact surface on which a cassette mounted into the cassette container is supported;

a pair of cassette guides for guiding a cassette of a predetermined size less than a predetermined maximum size among the plural kinds of cassettes of different sizes to a mounting position, the pair of cassette guides can be lowered to a lower side of the plate by insertion of a cassette having a size larger than the cassette of the predetermined size;

a pair of leaf springs for urging the pair of cassette guides toward an upper side of the plate, respectively, wherein the pair of cassette guides are inclined toward a cassette insertion side when the cassette guides are raised to the upper side of the plate upon urging by the pair of leaf springs, and said guides are positioned approximately parallel with the plate when said guides are lowered to the lower side of the plate upon insertion of a larger-sized cassette, and wherein each of the pair of leaf springs has a front leaf spring portion for urging a front portion of a corresponding guide and a rear leaf spring portion for urging a rear portion of a corresponding guide where a cassette insertion side of the cassette container is defined as a front side, the rear leaf spring portion having a resilient force weaker than the front leaf spring portion, and wherein said difference in resilient force for urging the pair of cassette guides upward renders the pair of cassette guides approximately parallel with the plate without inclination when the pair of cassette guides are lowered to the lower side of the plate upon insertion of the larger sized cassette.

2. The cassette container according to claim 1, further comprising stoppers for defining a lowest elevation of front portions of the pair of cassette guides when the pair of cassette guides are lowered to the lower side of the plate upon insertion of the larger-sized cassette, whereby the pair of cassette guides are positioned approximately parallel with the plate without inclination.

3. The cassette container according to claim 1, wherein the rear leaf spring portion has a narrower width than the front leaf spring portion.

4. The cassette container according to claim 2, wherein the front leaf spring portion has a longer length than the rear leaf spring portion.

* * * * *